United States Patent
Kubota et al.

(10) Patent No.: US 11,795,952 B2
(45) Date of Patent: Oct. 24, 2023

(54) ELECTRIC PUMP AND FAILURE STATE NOTIFICATION METHOD FOR ELECTRIC PUMP

(71) Applicant: YAMADA MANUFACTURING CO., LTD., Kiryu (JP)

(72) Inventors: Kei Kubota, Kiryu (JP); Hideyuki Sakurai, Kiryu (JP); Takuya Iwazaki, Kiryu (JP); Tatsuki Tanuma, Kiryu (JP); Masato Ito, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/783,415

(22) PCT Filed: Dec. 15, 2020

(86) PCT No.: PCT/JP2020/046726
§ 371 (c)(1),
(2) Date: Jun. 8, 2022

(87) PCT Pub. No.: WO2021/140846
PCT Pub. Date: Jul. 15, 2021

(65) Prior Publication Data
US 2023/0013660 A1    Jan. 19, 2023

Related U.S. Application Data

(60) Provisional application No. 62/958,313, filed on Jan. 8, 2020.

(51) Int. Cl.
*F04D 15/00*    (2006.01)
*F04D 15/02*    (2006.01)
(Continued)

(52) U.S. Cl.
CPC ..... *F04D 15/0077* (2013.01); *F04D 15/0281* (2013.01); *H02P 6/08* (2013.01); *H02P 27/085* (2013.01); *H02P 29/024* (2013.01)

(58) Field of Classification Search
CPC .... F04D 15/0077; F04D 15/0281; H02P 6/08; H02P 27/085; H02P 29/024
(Continued)

(56) References Cited

U.S. PATENT DOCUMENTS

| 7,102,306 B2* | 9/2006 | Hamaoka | F04B 35/04 |
| | | | 318/599 |
| 8,525,464 B2* | 9/2013 | Tanaka | G01P 3/48 |
| | | | 318/807 |

(Continued)

FOREIGN PATENT DOCUMENTS

| JP | 2010-183787 | 8/2010 |
| JP | 2013-013257 | 1/2013 |

(Continued)

OTHER PUBLICATIONS

International Search Report, dated Feb. 16, 2021, 2 pages.

*Primary Examiner* — David Luo
(74) *Attorney, Agent, or Firm* — Rankin, Hill & Clark LLP

(57) ABSTRACT

An electric pump includes a pump, a motor configured to drive the pump, a motor drive unit having a switching element and configured to drive the motor with electric power output from the switching element, and a control unit configured to output a pulse width modulation (PWM) signal for driving the switching element to the motor drive unit. The PWM signal output from the control unit, is used for monitoring a state of the motor. When the motor stops abnormally, the control unit sets a frequency of the PWM signal for use in monitoring the state of the motor to a
(Continued)

frequency outside of a frequency band which is used when the motor is normal.

12 Claims, 6 Drawing Sheets

(51) Int. Cl.
    *H02P 6/08*           (2016.01)
    *H02P 27/08*         (2006.01)
    *H02P 29/024*      (2016.01)

(58) Field of Classification Search
    USPC .......................................... 318/490, 599, 560
    See application file for complete search history.

(56) References Cited

U.S. PATENT DOCUMENTS

| | | | |
|---|---|---|---|
| 9,998,054 B1 * | 6/2018 | Yohanan | ................ H02P 27/047 |
| 10,044,306 B2 * | 8/2018 | Ademoye | ................ H02P 21/13 |

FOREIGN PATENT DOCUMENTS

| | | |
|---|---|---|
| JP | 2013-070490 | 4/2013 |
| JP | 2019-080382 | 5/2019 |

\* cited by examiner

ELECTRIC PUMP AND FAILURE STATE NOTIFICATION METHOD FOR ELECTRIC PUMP

Priority is claimed on U.S. Provisional Patent Application No. 62/958,313, filed Jan. 8, 2020, the content of which is incorporated herein by reference.

TECHNICAL FIELD

The present invention relates to an electric pump and a failure state notification method for the electric pump.

BACKGROUND ART

Patent Literature 1 describes an electric pump including a control unit that outputs a pulse signal indicating a rotational state of a motor.

In the electric pump described in Patent Literature 1, a motor drives a pump connected to the motor and a drive unit including a plurality of semiconductor switching elements drives the motor with a three-phase AC voltage. An input signal for driving the motor is input from an electronic control unit (ECU) to the control unit of the electric pump. The control unit of the electric pump outputs a drive signal for driving the motor to the drive unit on the basis of the input signal input from the ECU. Also, the control unit of the electric pump outputs a pulse signal indicating the rotational state of the motor to the ECU. The control unit is configured to change both a frequency and a duty ratio of the pulse signal so that it is possible to determine whether the motor is in a driven state or a stopped state and a plurality of states of the motor in the stopped state. Specifically, the control unit, combines frequency information and duty ratio information of the pulse signal and outputs the combined information as one pulse signal to the ECU. The control unit is configured to be able to individually change (control) a frequency and a duty ratio of one pulse signal.

Also, as described in Patent Literature 1, when the motor is in a stopped state, the control unit sets the frequency of the pulse signal to 4 Hz and the control unit changes a duty ratio of a pulse signal in correspondence with a plurality of states of the motor in the stopped state.

Furthermore, as described in Patent Literature 1, the control unit sets the frequency of the pulse signal to 4 Hz and the duty ratio of the pulse signal to 50% when the motor stops normally and an input signal transmitted from the ECU to the control unit is a stop signal for stopping the motor when the motor stops normally.

Also, as described in Patent Literature 1, when the motor is in the driven state (i.e., when the motor is not in the stopped state), the control unit variably changes the pulse signal in a frequency band different from 4 Hz in accordance with the rotational speed of the motor. In the electric pump described in Patent Literature 1, when the rotational speed of the motor is 160 rpm or less, (although the motor is not in the stopped state) the frequency of the pulse signal is set to 4 Hz, and when the rotational speed of the motor is higher than 160 rpm, the frequency of the pulse signal increases linearly as the rotational speed of the motor increases.

Also, as described in Patent Literature 1, the control unit sets the duty ratio of the pulse signal in 50% when the motor is driven normally, and the control unit sets the duty ratio or the pulse signal to 70% when the motor is in an abnormally driven state due to idling of the pump, and it is only necessary for the control unit to set a duty ratio in a state in which the motor is driven normally and a duty ratio in a state which the motor is driven abnormally different from each other.

CITATION LIST

Patent Literature

Patent Literature 1

Japanese Unexamined Patent Application, First Publication No. 2019-080382

SUMMARY OF INVENTION

Technical Problem

In a general electric pump that uses a pulse width modulation (PWM) signal as an interface (I/F) signal, the frequency of the PWM signal output (transmitted) from the control unit is used as a parameter indicating a rotational speed of the motor.

When both the frequency and the duty ratio of the signal are changed as in the technology described in Patent Literature 1 so that a notification of a failure state of the motor of the electric pump is provided to the ECU or the like, the ECU or the like needs to recognize the frequency and the duty ratio of the signal and the burden of recognition is imposed on the processing capacity of the ECU and the like.

In view of the above-described problems, an objective of the present invention is to provide an electric pump and a failure state notification method for the electric pump capable of monitoring a state of a motor in detail at the time of abnormal stopping while limiting an increase in a load of a process of monitoring the state of the motor.

Solution to Problem

According to an aspect of the present invention, there is provided an electric pump including a pump, a motor configured to drive the pump, a motor drive unit having a switching element and configured to drive the motor with electric power output from the switching element, and a control unit configured to output a PWM signal for driving the switching element to the motor drive unit, wherein the PWM signal output from the control unit is used for monitoring a state of the motor, wherein when the motor stops abnormally, the control unit sets a frequency of the PWM signal for use in monitoring the state of the motor to a frequency outside of a frequency band which is used when she motor is normal.

According to an aspect of the present invention, there is provided an electric pump including a pump, a motor configured to drive the pump, a motor drive unit having a switching element and configured to drive the motor with electric power output from the switching element, and a control unit configured to output a PWM signal for driving the switching element to the motor drive unit, wherein the PWM signal output from the control unit is used for monitoring a state of the motor, wherein when the motor stops abnormally, the control unit sets a duty ratio of the PWM signal for use in monitoring the state of the motor to a duty ratio different from a duty ratio which is used when the motor is normal, wherein the control unit includes an output switching unit configured to switch between a state in which the output switching unit outputs the PWM signal to the motor drive unit, and a state in which the output switching unit does not output the PWM signal to the motor drive unit, and wherein the output switching unit does not output the PWM signal for use in monitoring the state of the motor to the motor drive unit when the motor stops abnormally.

According to an aspect of the present invention, there is provided an electric pump including a pump, a motor configured to drive the pump, a motor drive unit having a switching element and configured to drive the motor with electric power output from the switching element, and a control unit configured to output a PWM signal for driving the switching element to the motor drive unit, wherein the PWM signal output from the control unit is used for monitoring a state of the motor, wherein when the motor stops abnormally, the control unit sets a frequency of the PWM signal for use in monitoring the state of the motor to a frequency outside of a frequency band which is used when the motor is normal and sets a duty ratio of the PWM signal for use in monitoring the state of the motor to a duty ratio different from a duty ratio which is used when the motor is normal.

According to an aspect of the present invention, there is provided a failure state notification method for an electric pump including a pump, a motor configured to drive the pump, a motor drive unit having a switching element and configured to drive the motor with electric power output from the switching element, and a control unit configured to output a PWM signal for driving the switching element to the motor drive unit, wherein the PWM signal output from the control unit is used for monitoring a state of the motor, the method including: a first step in which when the motor is normal, the control unit sets a frequency of the PWM signal for use in monitoring the state of the motor to a frequency within a first frequency band; and a second step in which when the motor stops abnormally, the control unit sets the frequency of the PWM signal for use in monitoring the state of the motor to a frequency within a second frequency band different from the first frequency band.

According to an aspect of the present invention, there is provided a failure state notification method for an electric pump including a pump, a motor configured to drive the pump, a motor drive unit having a switching element and configured to drive the motor with electric power output from the switching element, and a control unit configured to output a PWM signal for driving the switching element to the motor drive unit, wherein the PWM signal output from the control unit is used for monitoring a state of the motor, the method including; a first step in which when the motor is normal, the control unit sets a duty ratio of the PWM signal for use in monitoring the state of the motor to a first duty ratio; and a second step in which when the motor stops abnormally, the control unit sets the duty ratio of the PWM signal for use in monitoring the state of the motor to a second duty ratio different from the first duty ratio, wherein the PWM signal for use in monitoring the state of the motor is not output to the motor drive unit when the motor stops abnormally.

Advantageous Effects of Invention

According to the present invention, it is possible to provide an electric pump and a failure state notification method for the electric pump capable of monitoring a state of a motor in detail at the time of abnormal stopping while limiting an increase in a load of a process of monitoring the state of the motor.

BRIEF DESCRIPTION OF DRAWINGS

FIG. 2 is a diagram showing an example of relationships between rotational speeds [rpm] at a normal time and an over-rotation time of a motor and a frequency [Hz] of a PWM signal output from a control unit to a motor drive unit or the like.

FIG. 3 is a diagram showing an example of a waveform of a PWM signal output from the control unit when shown at a point A in FIG. 2 and the like.

DESCRIPTION OF EMBODIMENTS

Hereinafter, embodiments of an electric pump and a failure state notification method for the electric pump according to the present invention will be described.

First Embodiment

Figure 1:
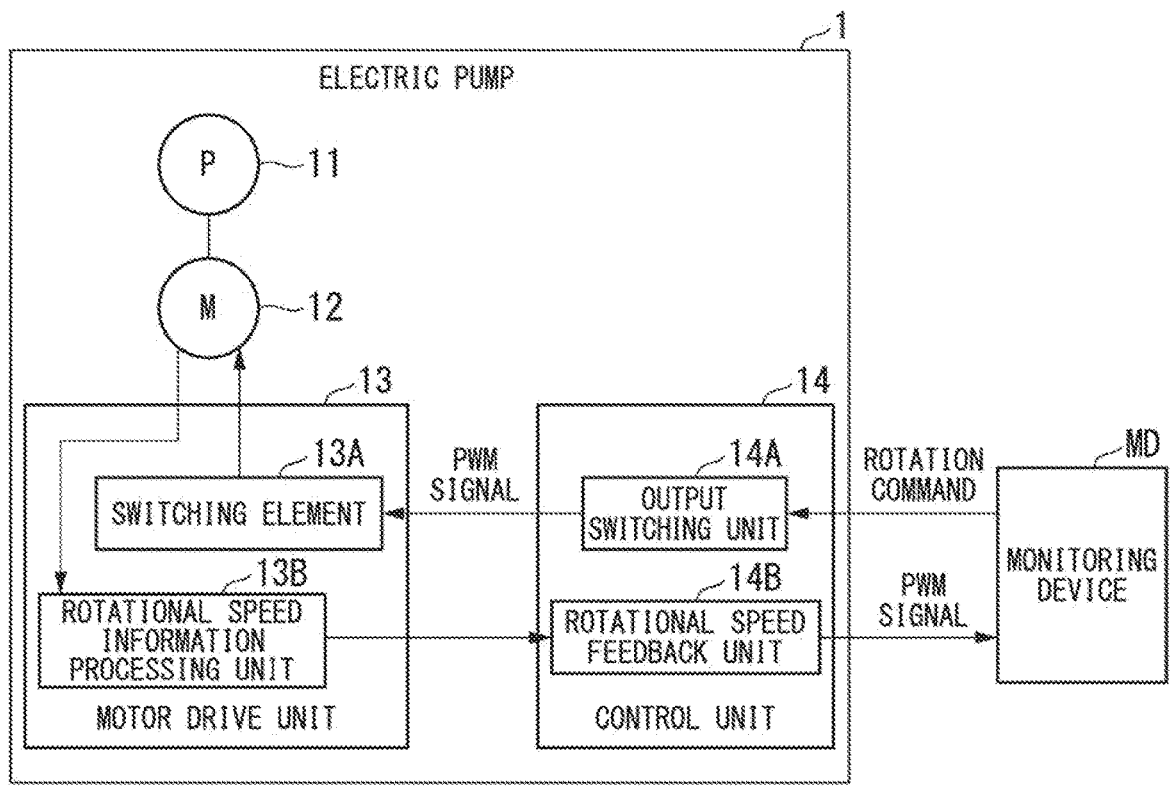
FIG. 1 is a diagram showing an example of a configuration of an electric pump and the like according to a first embodiment.

FIG. 1 is a diagram showing an example of a configuration of an electric pump 1 and the like according to a first embodiment.

In the example shown in FIG. 1, the electric pump 1 includes a pump 11, a motor 12, a motor drive unit 13, and a control unit 14.

The pump 11 performs a process of pumping fluids (mediums) such as water, oil, and fuel and the like. The motor 12 drives the pump 11.

The motor drive unit 13 is, for example, an inverter circuit or the like, and includes a switching element 13A and a rotational speed information processing unit 13B. The switching element 13A is, for example, a semiconductor switching element such as an insulated gate bipolar transistor (IGBT) or a metal-oxide-semiconductor field effect transistor (MOSFET). The motor drive unit 13 drives the motor 12 with electric power output from the switching element 13A. The rotational speed information processing unit 13B acquires information indicating a rotational speed of the motor 12 from the motor 12 and transmits the information to the control unit 14.

The control unit 14 is, for example, a gate drive circuit or the like, and outputs a pulse width modulation (PWM) signal for driving the switching element 13A to the motor drive unit 13.

In the example shown in FIG. 1, a monitoring device MD monitors a state of the motor 12. A PWM signal output from the control unit 14 is used for monitoring the state of the motor 12 in the monitoring device MD.

That is, in the example shown in FIG. 1, the control unit 14 is configured to be able to output a PWM signal to both the motor drive unit 13 and the monitoring device MD. Specifically, the control unit 14 includes an output switching unit 14A and a rotational speed feedback unit 14B. The output switching unit 14A switches between a state in which the output switching unit 14A outputs the PWM signal to the motor drive unit 13, and a state in which the output switching unit 14A does not output the PWM signal to the motor drive unit 13. The rotational speed feedback unit 14B acquires information indicating a rotational speed of the motor 12 transmitted by the rotational speed information processing unit 13B. Also, the rotational speed feedback unit 14B generates a PWM signal indicating the rotational speed of the motor 12 on the basis of the information indicating the rotational speed of the motor 12. The control unit 14 transmits the PWM signal indicating the rotational speed of the motor 12 generated by the rotational speed feedback unit 14B to the monitoring device MD.

That is, in the example shown in FIG. 1, the control unit 14 can output the PWM signal for driving the switching element 13A to the motor drive unit 13 and can output the PWM signal indicating the rotational speed of the motor 12 to the monitoring device MD.

Figure 2:
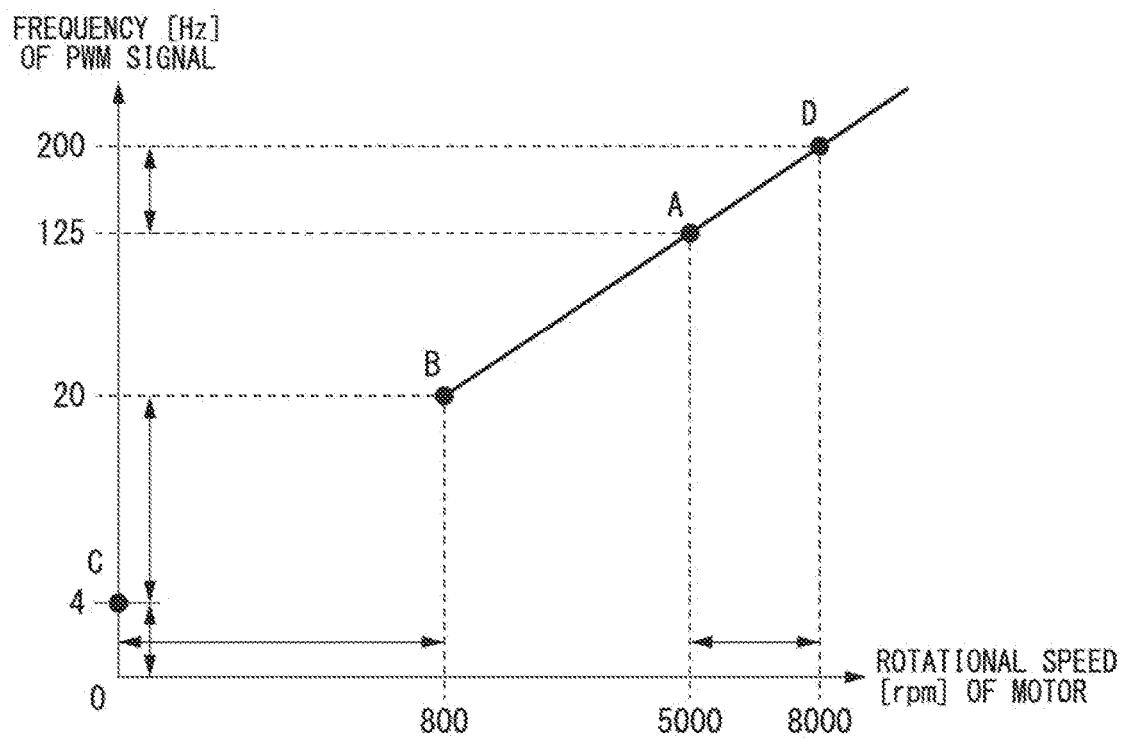

FIG. 2 is a diagram showing an example of relationships between rotational speeds [rpm] of the motor 12 at the normal time and the over-rotation time and the frequency [Hz] of the PWM signal output from the control unit 14 to the motor drive unit 13 and the like. The normal time of the motor 12 includes the time when the motor 12 is rotating normally and the time when the motor 12 stops normally.

In the example shown in FIG. 2, as shown at a point A, when the motor 12 constantly rotates at 5000 [rpm], a PWM signal of 125 [Hz] is output from the control unit 14 to the motor drive unit 13 and output from the control unit 14 to the monitoring device MD.

As shown at a point B, when the motor 12 constantly rotates at 800 [rpm], a PWM signal of 20 [Hz] is output from the control unit 14 to the motor drive unit 13 and output from the control unit 14 to the monitoring device MD.

As shown at a point C, when the motor 12 stops normally (i.e., when the rotational speed of the motor 12 is 0 [rpm] at the normal time of the motor 12), a PWM signal of 4 [Hz] is output from the control unit 14 to the monitoring device MD without being output from the control unit 14 to the motor drive unit 13.

As shown at a point D, when the motor 12 rotates at 8000 [rpm] (specifically, over-rotation), a PWM signal of 200 [Hz] is output from the control unit 14 to the motor drive unit 13 and output from the control unit 14 to the monitoring device MD.

Figure 3:
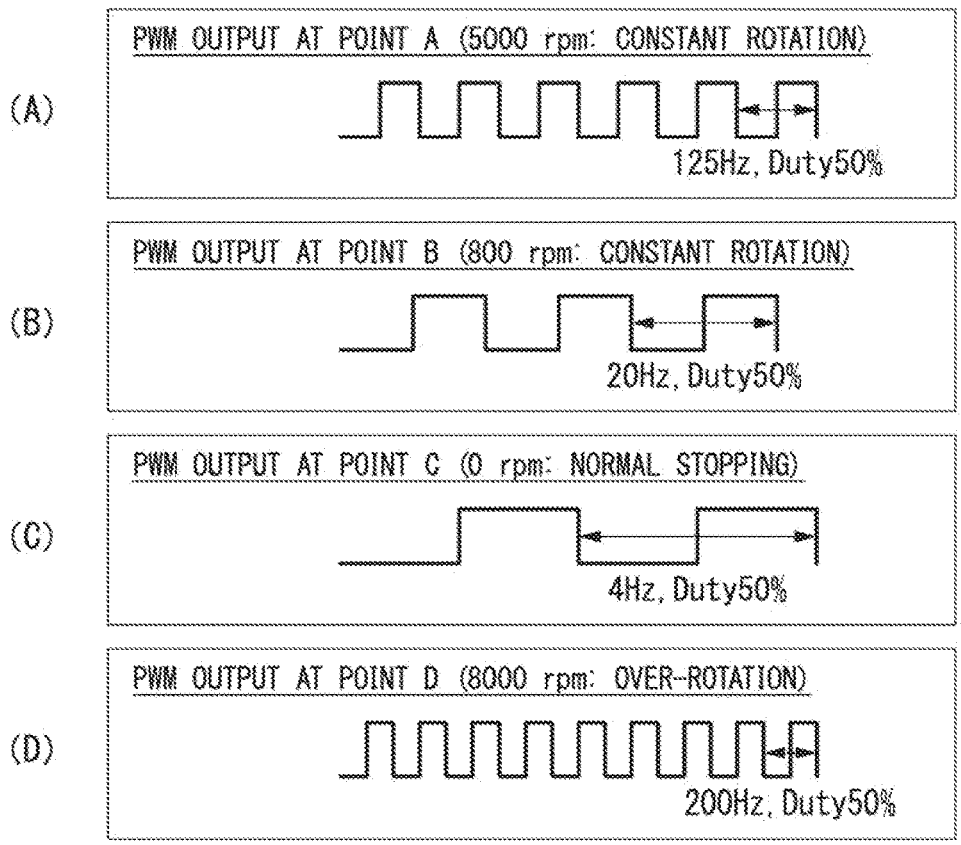

FIG. 3 is a diagram showing an example of a waveform of the PWM signal output from the control unit 14 when shown at the point A in FIG. 2 and the like. In detail, (A) of FIG. 3 shows an example of a waveform of a PWM signal output from the control unit 14 when shown at the point A in FIG. 2, (B) of FIG. 3 shows an example of a waveform of a PWM signal output from the control unit 14 when shown at the point B in FIG. 2, (C) of FIG. 3 shows an example of a waveform of a PWM signal output from the control unit 14 when shown at the point C in FIG. 2, and (D) of FIG. 3 shows an example of a waveform of a PWM signal output from the control unit 14 when shown at the point D in FIG. 2.

In the example shown in FIG. 2 and (A) of FIG. 3, when the motor 12 constantly rotates at 5000 [rpm], the control unit 14 outputs a PWM signal having a frequency of 125 [Hz] and a duty ratio of 50[%] to the monitoring device MD. Thus, the monitoring device MD that receives the PWM signal having the frequency of 125 [Hz] and the duty ratio of 50[%] can recognize that the motor 12 is constantly rotating at 5000 [rpm]. At this time, the control unit 14 outputs the PWM signal for rotating the motor 12 at 5000 [rpm] to the motor control unit 13.

In the example shown in FIG. 2 and (B) of FIG. 3, when the motor 12 constantly rotates at 800 [rpm], the control unit 14 outputs a PWM signal having a frequency of 20 [Hz] and a duty ratio of 50[%] to the monitoring device MD. Thus, the monitoring device MD that receives the PWM signal having the frequency of 20 [Hz] and the duty ratio of 50[%] can recognize that the motor 12 is constantly rotating at 800 [rpm]. At this time, the control unit 14 outputs a PWM signal for rotating the motor 12 at 800 [rpm] to the motor control unit 13.

In the example shown in FIG. 2 and (C) of FIG. 3, when the motor 12 stops normally, the control unit 14 outputs a PWM signal having a frequency of 4 [Hz] and a duty ratio of 50[%] to the monitoring device MD. Thus, the monitoring device MD that receives the PWM signal having the frequency of 4 [Hz] and the duty ratio of 50[%] can recognize that the motor 12 stops normally. At this time, the control unit 14 does not output the PWM signal to the motor control unit 13.

In the example shown in FIG. 2 and (D) of FIG. 3, when the motor 12 over-rotates at 8000 [rpm], the control unit 14 outputs a PWM signal having a frequency of 200 [Hz] and a duty ratio of 50[%] to the motor drive unit 13 and the monitoring device MD. Thus, the monitoring device MD that receives the PWM signal having the frequency of 200 [Hz] and the duty ratio of 50[%] can recognize that the motor 12 is over-rotating at 8000 [rpm]. Specifically, the monitoring device MD estimates that the electric pump 1 is in an abnormal load reduction state due to, for example, a disconnection of a pumping medium or the like.

In the example shown in FIGS. 2 and 3, a section indicated by a bidirectional arrow in FIG. 2 (a section where the frequency of the PWM signal is higher than 4 [Hz] and lower than 20 [Hz] (a section where the rotational speed of the motor 12 is higher than 0 [rpm] and lower than 800 [rpm]) and a section where the frequency of the PWM signal is higher than 125 [Hz] (a section where the rotational speed of the motor 12 is higher than 5000 [rpm])) corresponds to regions which are not normally used.

Figure 4:
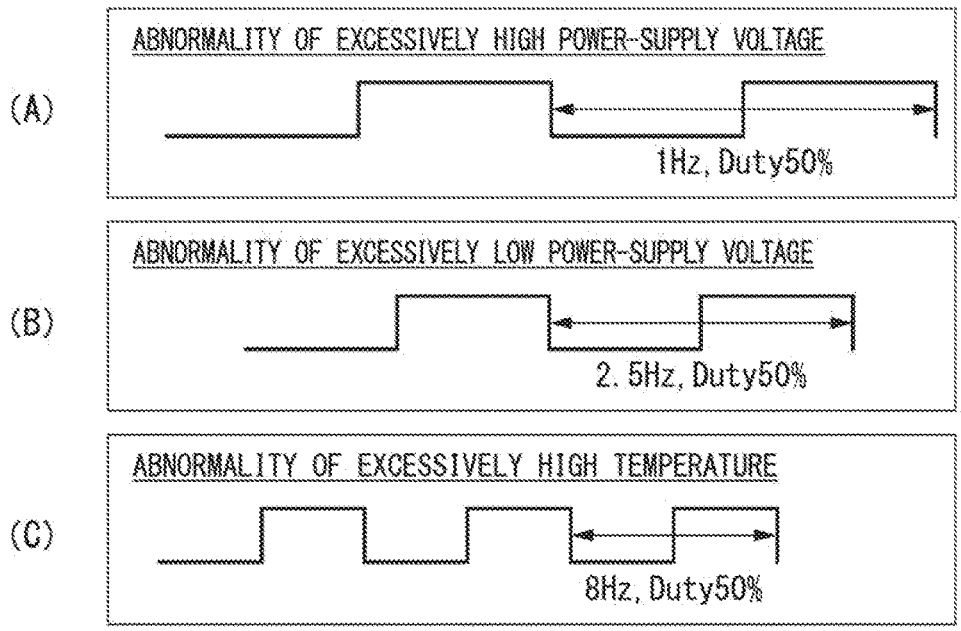
FIG. 4 is a diagram showing a waveform of a PWM signal for use in monitoring a state of the motor when the motor stops abnormally in a first example of the electric pump of the first embodiment.

FIG. 4 is a diagram showing a waveform of a PWM signal for use in monitoring the state of the motor 12 when the motor 12 stops abnormally in a first example of the electric pump 1 of the first embodiment. Specifically, (A) of FIG. 4 shows an example of a waveform of a PWM signal output from the control unit 14 when the motor 12 stops abnormally due to an excessively high voltage of the power supply (not shown) that supplies electric power to the motor 12 (i.e., when the rotational speed of the motor 12 is 0 [rpm] at the time of an abnormality of an excessively high power-supply voltage). (B) of FIG. 4 shows an example of a waveform of a PWM signal output from the control unit 14 when the motor 12 stops abnormally (i.e., when the rotational speed of the motor 12 is 0 [rpm] at the time of an abnormality of an excessively low power-supply voltage) because the voltage of the power supply that supplies electric power to the motor 12 is excessively low. (C) of FIG. 4 shows an example of a waveform of a PWM signal output from the control unit 14 when the motor 12 stops abnormally due to an excessively high temperature of the motor 12 (i.e., when the rotational speed of the motor 12 is 0 [rpm] at the time of an abnormality of an excessively high temperature).

In the example shown in (A) of FIG. 4, when the motor 12 stops abnormally due to an excessively high voltage of the power supply, the control unit 14 outputs a PWM signal having a frequency of 1 [Hz] and a duty ratio of 50[%] to the monitoring device MD. Thus, the monitoring device MD that receives the PWM signal having the frequency of 1 [Hz] and the duty ratio of 50[%] can recognize that the motor 12 stops abnormally because the voltage of the power supply is excessively high.

In the example shown in (B) of FIG. 4, when the motor 12 stops abnormally due to an excessively low voltage of the power supply, the control unit 14 outputs a PWM signal having a frequency of 2.5 [Hz] and a duty ratio of 50[%] to the monitoring device MD. Thus, the monitoring device ML) that receives the PWM signal having the frequency of 2.5 [Hz] and the duty ratio of 50[%] can recognize that the motor 12 stops abnormally because the voltage of the power supply is excessively low.

In the example shown in (C) of FIG. 4, when the motor 12 stops abnormally due to an excessively high temperature of the motor 12, the control unit 14 outputs a PWM signal having a frequency of 8 [Hz] and a duty ratio of 50[%] to the monitoring device MD. Thus, the monitoring device MD that receives the PWM signal having the frequency of 8 [Hz] and the duty ratio of 50[%] can recognize that the motor 12 stops abnormally because the temperature of the motor 12 is excessively high.

That is, in the first example of the electric pump 1 of the first embodiment shown in FIG. 4, when the motor 12 stops abnormally, the monitoring device MD can monitor the state of the motor 12 in detail at the time of abnormal stopping by changing only a frequency of the PWM signal output from the control unit 14.

That is, in the first example of the electric pump 1 of the first embodiment, it is unnecessary to change the duty ratio of the PWM signal output from the control unit 14, i.e., it is unnecessary to increase the load of the process of monitoring the state of the motor 12, and the monitoring device MD can recognize the cause of the abnormal stopping of the motor 12 (an excessively high power-supply voltage, an excessively low power-supply voltage, or an excessively high temperature of the motor).

In other words, in the first example of the electric pump 1 of the first embodiment, when the motor 12 stops abnormally, the control unit 14 sets the frequency of the PWM signal for use in monitoring the state of the motor 12 to a frequency (1 [Hz], 2.5 [Hz], or 8 [Hz]) outside of frequency bands (4 [Hz] and the frequency of 20 [Hz] or more and 125 [Hz] or less) which are used when the motor 12 is normal.

Thus, in the first example of the electric pump 1 of the first embodiment, the monitoring device MD can identify a state in which the motor 12 stops normally and a state in which the motor 12 stops abnormally only by recognizing the frequency of the PWM signal. Specifically, the monitoring device MD can identify the cause of the abnormal stopping of the motor 12 only by recognizing the frequency of the PWM signal.

TABLE 1

| | | Normal stopping | Failure A Excessively low voltage | Failure B Excessively high voltage | Failure C Overcurrent | Failure D Overheating | Failure E Motor lock | Failure F Command abnormality (grounding fault) | Failure G Command abnormality (frequency abnormality at stop command time) | Normal rotation |
| --- | --- | --- | --- | --- | --- | --- | --- | --- | --- | --- |
| | | | | | Abnormal stopping | | | | | |
| Frequency | Hz | 4 | 1 | 2 | 6 | 7 | 8 | 10 | 12 | 20~ |
| Ratio | % | 50 | 50 | 50 | 50 | 50 | 50 | 50 | 50 | 50 |

Table 1 shows a PWM signal for use in monitoring the state of the motor 12 when the motor 12 stops abnormally in a second example of the electric pump 1 of the first embodiment.

As shown in Table 1, in the second example of the electric pump 1 of the first embodiment, when the motor 12 stops normally, the control unit 14 sets the frequency of the PWM signal for use in monitoring the state of the motor 12 to 4 [Hz] within the frequency bands (4 [Hz] and the frequency of 20 [Hz] or more and 125 [Hz] or less) which are used when the motor 12 is normal and sets the duty ratio of the PWM signal to 50[%].

In the second example of the electric pump 1 of the first embodiment, if the failure state of the motor 12 is failure A ("excessively low voltage" of the power supply) when the motor 12 stops abnormally, the control unit 14 sets the frequency of the PWM signal for use in monitoring the state of the motor 12 to 1 [Hz] outside of the frequency bands (4 [Hz] and the frequency of 20 [Hz] or more and 125 [Hz] or less) which are used when the motor 12 is normal and sets the duty ratio of the PWM signal to 50[%].

In the second example of the electric pump 1 of the first embodiment, if the failure state of the motor 12 is failure B ("excessively high voltage" of the power supply) when the motor 12 stops abnormally, the control unit 14 sets the frequency of the PWM signal for use in monitoring the state of the motor 12 to 2 [Hz] outside of the frequency bands (4 [Hz] and the frequency of 20 [Hz] or more and 125 [Hz] or less) which are used when the motor 12 is normal and sets the duty ratio of the PWM signal to 50[%].

In the second example of the electric pump 1 of the first embodiment, if the failure state of the motor 12 is failure C ("overcurrent" of the motor 12) when the motor 12 stops abnormally, the control unit 14 sets the frequency of the PWM signal for use in monitoring the state of the motor 12 to 6 [Hz] outside of the frequency bands (4 [Hz] and the frequency of 20 [Hz] or more and 125 [Hz] or less) which are used when the motor 12 is normal and sets the duty ratio of the PWM signal to 50[%].

In the second example of the electric pump 3 of the first embodiment, if the failure state of the motor 12 is failure D ("overheating" of the motor 12) when the motor 12 stops abnormally, the control unit 14 sets the frequency of the PWM signal for use in monitoring the state of the motor 12 to 7 [Hz] outside of the frequency bands (4 [Hz] and the frequency of 20 [Hz] or more and 125 [Hz] or less) which are used when the motor 12 is normal and sets the duty ratio of the PWM signal to 50[%].

In the second example of the electric pump 1 of the first embodiment, if the failure state of the motor 12 is failure E ("motor lock") when the motor 12 stops abnormally, the control unit 14 sets the frequency of the PWM signal for use in monitoring the state of the motor 12 to 8 [Hz] outside of the frequency bands (4 [Hz] and the frequency of 20 [Hz] or more and 125 [Hz] or less) which are used when the motor 12 is normal and sets the duty ratio of the PWM signal to 50[%].

In the second example of the electric pump 1 of the first embodiment, if the failure state of the motor 12 is failure F ("command abnormality (grounding fault)" for the motor drive unit 13) when the motor 12 stops abnormally, the control unit 14 sets the frequency of the PWM signal for use in monitoring the state of the motor 12 to 10 [Hz] outside of the frequency bands (4 [Hz] and the frequency of 20 [Hz] or more and 125 [Hz] or less) which are used when the motor 12 is normal and sets the duty ratio of the PWM signal to 50[%].

In the second example of the electric pump 1 of the first embodiment, if the failure state of the motor 12 is failure G ("command abnormality (frequency abnormality at stop command time)" for the motor drive unit 13) when the motor 12 stops abnormally, the control unit 14 sets the frequency of the PWM signal for use in monitoring the state of the motor 12 to 12 [Hz] outside of the frequency bands (4 [Hz] and the frequency of 20 [Hz] or more and 125 [Hz] or less) which are used when the motor 32 is normal and sets the duty ratio of the PWM signal to 50[%].

That is, in the second example of the electric pump 1 of the first embodiment, a duty ratio of the PWM signal for use in monitoring the motor 12 in the states of failure A ("excessively low voltage" of the power supply), failure B ("excessively high voltage" of the power supply), failure C ("overcurrent" of the motor 12), failure D ("overheating" of motor 12), failure E ("motor lock"), failure F ("command abnormality (grounding fault)" for motor drive unit 13), and failure G ("command abnormality (frequency abnormality at stop command time)" for the motor drive unit 13) to 50[%] equal to the duty ratio which is used when the motor 12 stops normally.

In the second example of the electric pump 1 of the first embodiment, when the motor 12 rotates normally, the control unit 14 sets the frequency of the PWM signal for use in monitoring the state of the motor 12 to a frequency of 20 [Hz] to 125 [Hz] within the frequency bands (4 [Hz] and the frequency of 20 [Hz] or more and 125 [Hz] or less) which are used when the motor 12 is normal and sets the duty ratio of the PWM signal to 50[%].

That is, in the second example of the electric pump 1 of the first embodiment, when the motor 12 stops abnormally, only the frequency of the PWM signal output from the control unit 14 is changed, so that the monitoring device MD can monitor the state of the motor 12 in detail at the time of abnormal stopping.

That is, in the second example of the electric pump 1 of the first embodiment, it is unnecessary to change the duty ratio of the PWM signal output from the control unit 14, i.e., it is unnecessary to increase the load of the process of monitoring the state of the motor 12, and the monitoring device MD can recognize the cause of the abnormal stopping of the motor 12 (an excessively high power-supply voltage, an excessively low power-supply voltage, overcurrent of the motor, overheating of the motor, motor lock, a command abnormality (grounding fault), or a command abnormality (a frequency abnormality at the stop command time)).

Furthermore, in the second example of the electric pump 1 of the first embodiment, the output switching unit 14A of the control unit 14 does not output the PWM signal for use in monitoring the motor 12 in the states of failure A ("excessively low voltage" of the power supply), failure B ("excessively high voltage" of the power supply), failure C ("overcurrent" of the motor 12), failure D ("overheating" of the motor 12), failure E ("motor lock"), failure F ("command abnormality (grounding fault)" for the motor drive unit 13), and failure G ("command abnormality (frequency abnormality at stop command time)" for the motor drive unit 13) to the motor drive unit 13.

Although the monitoring device MD identifies seven types of failure states as causes when the motor 12 stops abnormally by recognizing the frequency of the PWM signal in the second example of the electric pump 1 of the first embodiment as described above, the monitoring device MD may identify two types of failure states as causes when the motor 12 stops abnormally by recognizing the frequency of the PWM signal in another example of the electric pump 1 of the first embodiment.

In the present example, when the failure state of the motor 12 is the first failure state (for example, "excessively low voltage" of the power supply), the control unit 14 sets the frequency of the PWM signal for use in monitoring the state of the motor 12 to a first frequency (for example, 1 [Hz]) outside of the frequency bands (4 [Hz] and the frequency of 20 [Hz] or more and 125 [Hz] or less) which are used when the motor 12 is normal.

When the failure state of the motor 12 is a second failure state (for example, "excessively high voltage" of the power supply) different from the first failure state (for example, "excessively low voltage" of the power supply), the control unit 14 sets the frequency of the PWM signal for use in monitoring the state of the motor 12 to a second frequency (for example, 2 [Hz]) outside of the frequency bands (4 [Hz] and the frequency of 20 [Hz] or more and 125 [Hz] or less) which are used when the motor 12 is normal and different from the first frequency (for example, 1 [Hz]).

Further, the control unit 14 sets a duty ratio of the PWM signal for use in monitoring the motor 12 in the first failure state (for example, "excessively low voltage" of the power supply) and a duty ratio of the PWM signal for use in monitoring the motor 12 in the second failure state (for example, "excessively high voltage" of the power supply) to a value equal to a duty ratio (50%) which is used when the motor 12 stops normally.

In the present example, the output switching unit 14A does not output a PWM signal for use in monitoring the motor 12 in the first failure state (for example, "excessively low voltage" of the power supply) and the second failure state (for example, "excessively high voltage" of the power supply) to the motor drive unit 13.

Figure 5:
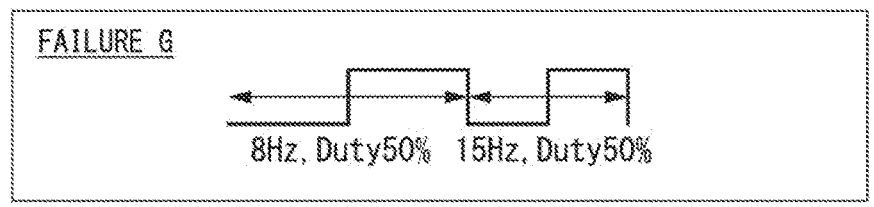
FIG. 5 is a diagram showing a waveform of a PWM signal for use in monitoring a state of the motor when the motor stops abnormally in a third example of the electric pump of the first embodiment.

FIG. 5 is a diagram showing a waveform of a PWM signal for use in monitoring the state of the motor 12 when the motor 12 stops abnormally in the third example of the electric pump 1 of the first embodiment.

As described above, in the second example of the electric pump 1 of the first embodiment, if the failure state of the motor 12 is failure G ("command abnormality (frequency abnormality at stop command time)" for the motor drive unit 13) when the motor 12 stops abnormally, the control unit 14 sets the frequency of the PWM signal for use in monitoring the state of the motor 12 to 12 [Hz] outside of the frequency bands (4 [Hz] and the frequency of 20 [Hz] or more and 125 [Hz] or less) which are used when the motor 12 is normal and sets the duty ratio of the PWM signal to 50[%].

On the other hand, in the third example of the electric pump 1 of the first embodiment, if the failure state of the motor 12 is failure G ("command abnormality (frequency abnormality at stop command time)" for the motor drive unit 13) when the motor 12 stops abnormally, the control unit 14 sets the PWM signal for use in monitoring the state of the motor 12 to a signal including a pulse stream obtained by combining a first pulse having a frequency of 8 [Hz] and a second pulse having a frequency of 15 [Hz] when the motor 12 stops abnormally as shown in FIG. 5.

That is, in the third example of the electric pump 1 of the first embodiment, the control unit 14 sets the PWM signal for use in monitoring the state of the motor 12 when the motor 12 stops abnormally to a signal including a pulse stream obtained by combining the first pulse having the frequency of 8 [Hz] outside of the frequency bands (4 [Hz] and the frequency of 20 [Hz] or more and 125 [Hz] or less) which are used when the motor 12 is normal and the second pulse having the frequency of 15 [Hz] different front the first frequency (8 [Hz]) outside of the frequency bands (4 [Hz] and the frequency of 20 [Hz] or more and 125 [Hz] or less) which are used when the motor 12 is normal.

Thus, in the third example of the electric pump 1 of the first embodiment, the control unit 14 can output various types of PWM signals for use in monitoring the state of the motor 12 to the monitoring device MD when the motor 12 stops abnormally and identify various types of failure states more than the seven types thereof.

Also, in the third example of the electric pump 1 of the first embodiment, the output switching unit 14A does not output the PWM signal for use in monitoring the state of the motor 12 to the motor drive unit 13 when the motor 12 stops abnormally.

Figure 6:
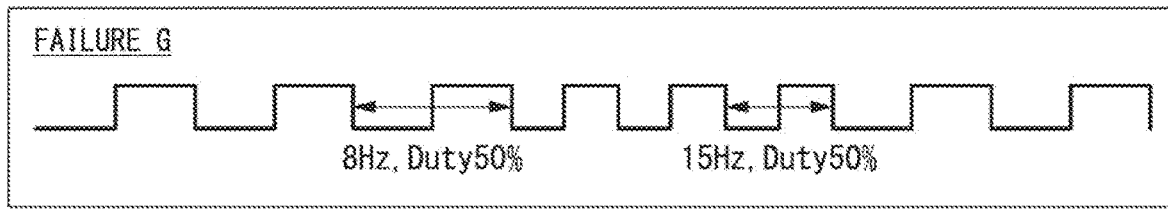
FIG. 6 is a diagram showing a waveform of a PWM signal for use in monitoring a state of the motor when the motor stops abnormally in a fourth example of the electric pump of the first embodiment.

FIG. 6 is a diagram showing a waveform of a PWM signal for use in monitoring the state of the motor 12 when the motor 12 stops abnormally in the fourth example of the electric pump 1 of the first embodiment.

In the fourth example of the electric pump 1 of the first embodiment, if the failure state of the motor 12 is failure G ("command abnormality (frequency abnormality at stop command time)" for the motor drive unit 13) when the motor 12 stops abnormally, the control unit 14 sets the PWM signal for use in monitoring the state of the motor 12 to a signal including a pulse stream obtained by combining a pulse stream obtained by repeating a first pulse having a frequency of 8 [Hz], for example, three times, and a pulse stream obtained by repeating a second pulse having a frequency of 15 [Hz], for example, three times, as shown in FIG. 6.

That is, in the fourth example of the electric pump 1 of the first embodiment, the control unit 14 sets the PWM signal for use in monitoring the state of the motor 12 when the motor 12 stops abnormally to a signal including a pulse stream obtained by combining a pulse stream obtained by repeating a first pulse having a first frequency (8 [Hz]) outside of the frequency bands (4 [Hz] and the frequency of 20 [Hz] or more and 125 [Hz] or less) which are used when the motor 12 is normal a plurality of times and a pulse stream obtained by repeating a second pulse having a second frequency (15 [Hz]) different from the first frequency (8 [Hz]) outside of the frequency bands (4 [Hz] and the frequency of 20 [Hz] or more and 125 [Hz] or less) which are used when the motor 12 is normal a plurality of times.

Thus, in the fourth example of the electric pump 1 of the first embodiment, as in the third example of the electric pump 1 of the first embodiment, the control unit 14 can output a large number of various types of PWM signals for use in monitoring the state of the motor 12 to the monitoring device MD when the motor 12 stops abnormally and identify various types of failure states more than the seven types thereof.

Also, in the fourth example of the electric pump 1 of the first embodiment, the output switching unit 14A does not output the PWM signal for use in monitoring the state of the motor 12 to the motor drive unit 13 when the motor 12 stops abnormally.

Figure 7:
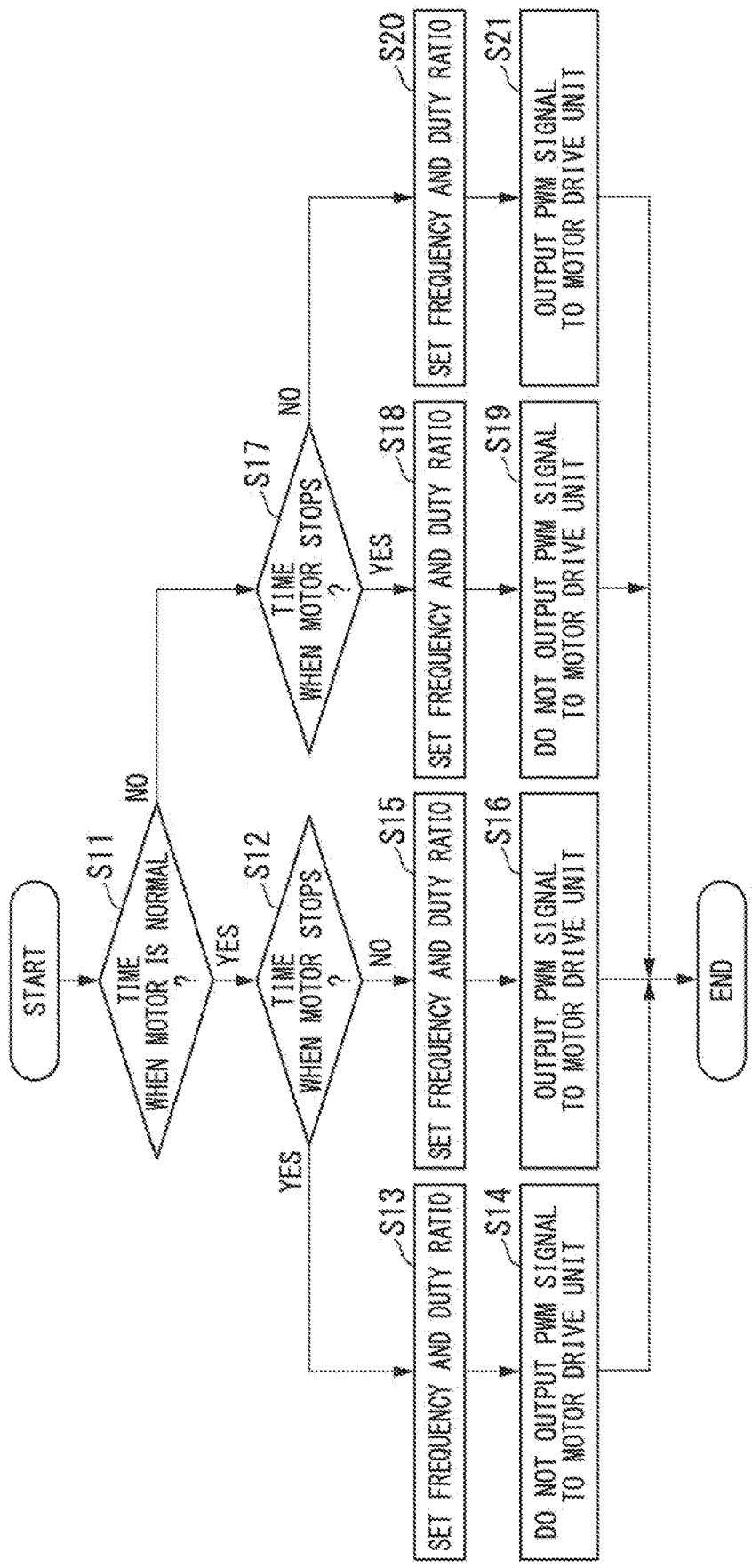
FIG. 7 is a flowchart for describing an example of a process executed in the electric pump of the first embodiment.

FIG. 7 is a flowchart for describing an example of a process executed in the electric pump 1 of the first embodiment.

In the example shown in FIG. 7, in step S11, the control unit 14 determines whether or not the time is the time when the motor is normal. For example, in the case where the voltage of the power supply that supplies electric power to the motor 12 is excessively high, the case where the voltage of the power supply is excessively low, the case where the temperature of the motor 12 is excessively high (i.e., the case where the motor 12 is overheated), the case where the current flowing through the motor 12 is excessive (i.e., the case of the overcurrent of the motor 12), the case of motor lock, the case where a command abnormality (grounding fault) for the motor drive unit 13 occurs, the case where the command abnormality (the frequency abnormality at the stop command time) for the motor drive unit 13 occurs, the case where the motor 12 is in an over-rotation state, and the like, the control unit 14 determines that the time is the time when the motor 12 is abnormal and proceeds to step S17. On the other hand, when the control unit 14 determines that the time is the time when the motor is normal, the process proceeds to step S12.

In step S12, the control unit 14 determines whether or not the time is the time when the motor stops. When the control unit 14 determines that the time is the time when the motor stops (i.e., when the motor 12 stops normally), the process proceeds to step S13. On the other hand, when the control unit 14 determines that the time is not the time when the motor stops (i.e., when the motor 12 is constantly rotating), the process proceeds to step S15.

In step S13, the control unit 14 sets the frequency of the PWM signal to 4 [Hz] which is a frequency within a first frequency bands (4 [Hz] and the frequency of 20 [Hz] or more and 125 [Hz] or less) which are used when the motor 12 is normal and sets the duty ratio of the PWM signal to 50[%].

Subsequently, in stop S14, the control unit 14 outputs the PWM signal in which the frequency (4 [Hz]) and the duty ratio (50[%]) are set in step S13 to the monitoring device MD without outputting the PWM signal to the motor drive unit 13. The PWM signal output to the monitoring device MD is used for monitoring the state of the motor 12.

In step S15, the control unit 14 sets the frequency of the PWM signal to a frequency of 20 [Hz] or more and 125 [Hz] or less as a frequency within the first frequency bands (4 [Hz] and the frequency of 20 [Hz] or more and 125 [Hz] or less) which are used when the motor 12 is normal and sets the duty ratio of the PWM signal to 50[%].

Subsequently, in step S16, the control unit 14 outputs a PWM signal in which the frequency (the frequency of 20 [Hz] or more and 125 [Hz] or less) and the duty ratio (50[%]) are set in step S15 to the monitoring device MD. The PWM signal output to the monitoring device MD is used for monitoring the state of the motor 12. At this time, the control unit 14 outputs a PWM signal for rotating the motor 12 at a rotational speed of 800 [rpm] or more and 5000 [rpm] or less to the motor control unit 13.

In step S17, the control unit 14 determines whether or not the time is the time when the motor stops. When the control unit 14 determines that the time is the time when the motor stops (i.e., when the motor 12 stops abnormally), the process proceeds to step S18. On the other hand, when the control unit 14 determines that the time is not the time when the motor stops (i.e., when the motor 12 rotates abnormally), the process proceeds to step S20.

In step S18, the control unit 14 sets the frequency of the PWM signal to a frequency (for example, 1 [Hz], 2.5 [Hz], 8 [Hz], or the like) within second frequency bands (a frequency band lower than 4 [Hz] and a frequency band higher than 4 [Hz] and lower than 20 [Hz]) different from the first frequency bands (4 [Hz] and the frequency of 20 [Hz] or more and 125 [Hz] or less) which are used when the motor 12 is normal and sets the duty ratio of the PWM signal to 50[%].

Subsequently, in step S19, the control unit 14 outputs a PWM signal in which a frequency (for example, a frequency such as 1 [Hz], 2.5 [Hz], or 8 [Hz]) and a duty ratio (50[%]) are set in step S18 to the monitoring device MD without outputting the PWM signal to the motor drive unit 13. The PWM signal output to the monitoring device MD is used for monitoring the state of the motor 12.

In step S20, the control unit 14 sets the frequency of the PWM signal to a frequency higher than that of the first frequency bands (4 [Hz] and the frequency of 20 [Hz] or more and 125 [Hz] or less) which are used when the motor 12 is normal and sets the duty ratio of the PWM signal to 50[%].

Subsequently, in step S21, the control unit 14 outputs a PWM signal in which the frequency (for example, 200 [Hz] or the like) and the duty ratio (50[%]) are set in step S20 to the monitoring device MD. The PWM signal output to the monitoring device MD is used for monitoring the state of the motor 12. At this time, the control unit 14 outputs a PWM signal for rotating the motor 12 to the motor control unit 13.

Second Embodiment

Hereinafter, a second embodiment of an electric pump and a failure state notification method for the electric pump according to the present invention will be described.

An electric pump 1 of the second embodiment is configured to have a configuration similar to that of the electric pump 1 of the first embodiment described above, except for differences to be described below. Accordingly, according to the electric pump 1 of the second embodiment, it is possible to obtain effects similar to those of the electric pump 1 of the first embodiment described above, except for the differences to be described below.

Figure 8:
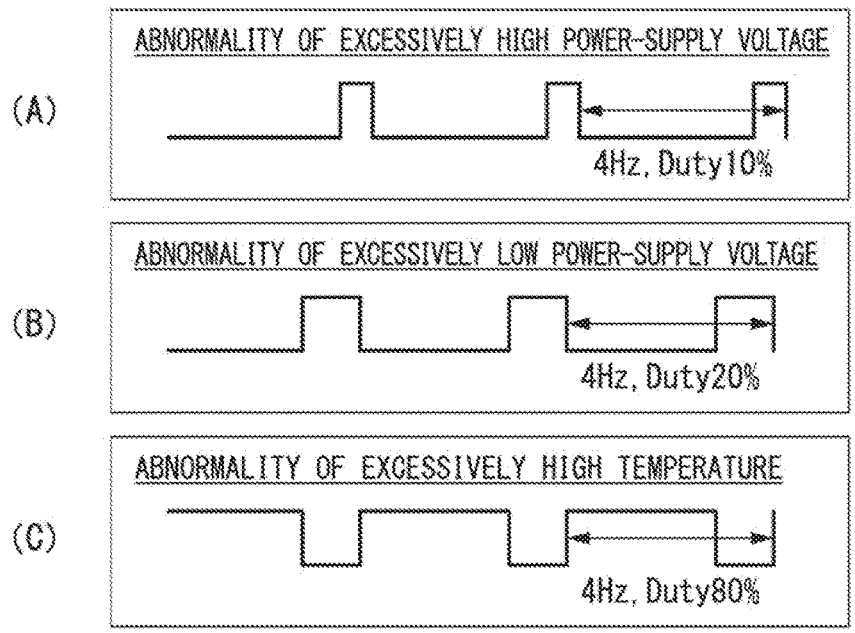
FIG. 8 is a diagram showing a waveform of a PWM signal for use in monitoring a state of the motor when the motor stops abnormally in a first example of an electric pump of a second embodiment.

FIG. 8 is a diagram showing a waveform of a PWM signal for use in monitoring the state of the motor 12 when the motor 12 stops abnormally in a first example of the electric pump 1 of the second embodiment. Specifically, (A) of FIG. 8 shows an example of a waveform of a PWM signal output from the control unit 14 when the motor 12 stops abnormally due to an excessively high voltage of the power supply that supplies electric power to the motor 12 (i.e., when the rotational speed of the motor 12 is 0 [rpm] at the time of an abnormality of an excessively high power-supply voltage). (B) of FIG. 8 shows an example of a waveform of a PWM signal output from the control unit 14 when the motor 12 stops abnormally (i.e., when the rotational speed of the motor 12 is 0 [rpm] at the time of an abnormality of an excessively low power-supply voltage) because the voltage of the power supply that supplies electric power to the motor 12 is excessively low. (C) of FIG. 8 shows an example of a waveform of a PWM signal output from the control unit 14 when the motor 12 stops abnormally due to an excessively high temperature of the motor 12 (i.e., when the rotational speed of the motor 12 is 0 [rpm] at the time of an abnormality of an excessively high temperature).

In the example shown in (A) of FIG. 8, when the motor 12 stops abnormally due to an excessively high voltage of the power supply, the control unit 14 outputs a PWM signal having a frequency of 4 [Hz] and a duty ratio of 10[%] to the monitoring device MD. Thus, the monitoring device MD that receives the PWM signal having the frequency of 4 [Hz] and the duty ratio of 10[%] can recognize that the motor 12 stops abnormally because the voltage of the power supply is excessively high.

In the example shown in (B) of FIG. 8, when the motor 12 stops abnormally due to an excessively low voltage of the power supply, the control unit 14 outputs a PWM signal having a frequency of 4 [Hz] and a duty ratio of 20[%] to the monitoring device MD. Thus, the monitoring dev ice MD that receives the PWM signal having the frequency of 4 [Hz] and the duty ratio of 20[%] can recognize that the motor 12 stops abnormally because the voltage of the power supply is excessively low.

In the example shown in (C) of FIG. 8, when the motor 12 stops abnormally due to an excessively high temperature of the motor 12, the control unit 14 outputs a PWM signal having a frequency of 4 [Hz] and a duty ratio of 80[%] to the monitoring device MD. Thus, the monitoring device MD that receives the PWM signal having the frequency of 4 [Hz] and the duty ratio of 80[%] can recognize that the motor 12 stops abnormally because the temperature of the motor 12 is excessively high.

That is, in the first example of the electric pump 1 of the second embodiment shown in FIG. 8, when the motor 12 stops abnormally, the monitoring device MD can monitor the state of the motor 12 in detail at the time of abnormal stopping by changing only a duty ratio of the PWM signal output from the control unit 14.

That is, in the first example of the electric pump 1 of the second embodiment, if is unnecessary to change the frequency of the PWM signal output from the control unit 14, i.e., it is unnecessary to increase the load of the process of monitoring the state of the motor 12, and the monitoring device MD can recognize the cause of the abnormal stopping of the motor 12 (an excessively high power-supply voltage, an excessively low power-supply voltage, or an excessively high temperature of the motor).

In other words, in the first example of the electric pump 1 of the second embodiment, when the motor 12 stops abnormally, the control unit 14 sets a duty ratio of the PWM signal for use in monitoring the state of the motor 12 to a duty ratio (10[%], 20[%], or 80[%]) different from a duty ratio (50[%]) which is used when the motor 12 is normal.

Thus, in the first example of the electric pump 1 of the second embodiment, the monitoring device MD can identify a state in which the motor 12 stops normally and a state in which the motor 12 stops abnormally only by recognizing the duty ratio of the PWM signal. Specifically, the monitoring device MD can identify the cause of the abnormal stopping of the motor 12 only by recognizing the duty ratio of the PWM signal.

Furthermore, in the first example of the electric pump 1 of the second embodiment, the output switching unit 14A of the control unit 14 does not output a PWM signal for use in monitoring the state of the motor 12 to the motor drive unit 13 when the motor 12 stops abnormally.

12 to 4 [Hz] and sets the duty ratio of the PWM signal to 30[%] different from 50[%], 5[%], 10[%], and 20[%].

In the second example of the electric pump 1 of the second embodiment, if the failure state of the motor 12 is failure E ("motor lock") when the motor 12 stops abnormally, the control unit 14 sets the frequency of the PWM signal for use in monitoring the state of the motor 12 to 4 [Hz] and sets the duty ratio of the PWM signal to 70[%] different from 50[%], 5[%], 10[%], 20[%], and 30[%].

In the second example of the electric pump 1 of the second embodiment, if the failure state of the motor 12 is failure F ("command abnormality (grounding fault)" for the motor drive unit 13) when the motor 12 stops abnormally, the control unit 14 sets the frequency of the PWM signal for use in monitoring the state of the motor 12 to 4 [Hz] and sets

TABLE 2

| | | Normal stopping | Abnormal stopping | | | | | | | Normal rotation |
|---|---|---|---|---|---|---|---|---|---|---|
| | | | Failure A Excessively low voltage | Failure B Excessively high voltage | Failure C Overcurrent | Failure D Overheating | Failure E Motor lock | Failure F Command abnormality (grounding fault) | Failure G Command abnormality (frequency abnormality at stop command time) | |
| Frequency | Hz | 4 | 4 | 4 | 4 | 4 | 4 | 4 | 4 | 20~ |
| Ratio | % | 50 | 5 | 10 | 20 | 30 | 70 | 80 | 90 | 50 |

Table 2 shows a PWM signal for use in monitoring the state of the motor 12 when the motor 12 stops abnormally in a second example of the electric pump 1 of the second embodiment.

As shown in Table 2, in the second example of the electric pump 1 of the second embodiment, when the motor 12 stops normally, the control unit 14 sets the frequency of the PWM signal for use in monitoring the state of the motor 12 to 4 [Hz] and sets the duty ratio of the PWM signal to 50[%].

In the second example of the electric pump 1 of the second embodiment, if the failure state of the motor 12 is failure A ("excessively low voltage" of the power supply) when the motor 12 stops abnormally, the control unit 14 sets the frequency of the PWM signal for use in monitoring the state of the motor 12 to 4 [Hz] and sets the duty ratio of the PWM signal to 5[%] different from the duty ratio (50[%]) which is used when the motor 12 is normal.

In the second example of the electric pump 1 of the second embodiment, if the failure state of the motor 12 is failure B ("excessively high voltage" of the power supply) when the motor 12 stops abnormally, the control unit 14 sets the frequency of the PWM signal for use in monitoring the state of the motor 12 to 4 [Hz] and sets the duty ratio of the PWM signal to 10[%] different from 50[%] and 5[%].

In the second example of the electric pump 1 of the second embodiment, if the failure state of the motor 12 is failure C ("overcurrent" of the motor 12) when the motor 12 stops abnormally, the control unit 14 sets the frequency of the PWM signal for use in monitoring the state of the motor 12 to 4 [Hz] and sets the duty ratio of the PWM signal to 20[%] different from 50[%], 5[%], and 10[%].

In the second example of the electric pump 1 of the second embodiment, if the failure state of the motor 12 is failure D ("overheating" of the motor 12) when the motor 12 stops abnormally, the control unit 14 sets the frequency of the PWM signal for use in monitoring the state of the motor the duty ratio of the PWM signal to 80[%] different from 50[%], 5[%], 10[%], 20[%], 30[%], and 70[%].

In the second example of the electric pump 1 of the second embodiment, if the failure state of the motor 12 is failure G ("command abnormality (frequency abnormality at the time of stop command)") when the motor 12 stops abnormally, the control unit 14 sets the frequency of the PWM signal for use in monitoring the state of the motor 12 to 4 [Hz] and sets the duty ratio of the PWM signal to 90[%] different from 50[%], 5[%], 10 [%], 20[%], 30[%], 70[%], and 80[%].

That is, in the second example of the electric pump 1 of the second embodiment, a frequency of the PWM signal for use in monitoring the motor 12 in the states of failure A ("excessively low voltage" of the power supply), failure B ("excessively high voltage" of the power supply), failure C ("overcurrent" of the motor 12), failure D ("overheating" of motor 12), failure E ("motor lock"), failure F ("command abnormality (grounding fault)" for the motor drive unit 13), and failure G ("command abnormality (frequency abnormality at stop command time)") is set to 4 [Hz] equal to the frequency used when the motor 12 stops normally.

In the second example of the electric pump 1 of the second embodiment, when the motor 12 rotates normally, the control unit 14 sets the frequency of the PWM signal for use in monitoring the state of the motor 12 to a frequency of 20 [Hz] to 125 [Hz] within the frequency bands (4 [Hz] and the frequency of 20 [Hz] or more and 125 [Hz] or less) which are used when the motor 12 is normal and sets the duty ratio of the PWM signal to 50[%].

That is, in the second example of the electric pump 1 of the second embodiment, when the motor 12 stops abnormally, only the duty ratio of the PWM signal output from the control unit 14 is changed and therefore the monitoring device MD can monitor the state of the motor 12 in detail at the time of abnormal stopping.

That is, in the second example of the electric pump 1 of the second embodiment, it is unnecessary to change the frequency of the PWM signal output from the control unit 14, i.e., it is unnecessary to increase the load of the process of monitoring the state of the motor 12, and the monitoring device MD can recognize the cause of the abnormal stopping of the motor 12 (an excessively high power-supply voltage, an excessively low power-supply voltage, overcurrent of the motor, overheating of the motor, motor lock, a command abnormality (grounding fault), or a command abnormality (a frequency abnormality at the stop command time)).

Furthermore, in the second example of the electric pump 1 of the second embodiment, the output switching unit 14A of the control unit 14 does not output the PWM signal for use in monitoring the motor 12 in the states of failure A ("excessively low voltage" of the power supply), failure B ("excessively high voltage" of the power supply), failure C ("overcurrent" of the motor 12), failure D ("overheating" of the motor 12), failure E ("motor lock"), failure F ("command abnormality (grounding fault)" for the motor drive unit 13), and failure G ("command abnormality (frequency abnormality at stop command time)" for the motor drive unit 13) to the motor drive unit 13.

Although the monitoring device MD identifies seven types of failure states as causes when the motor 12 stops abnormally by recognizing the duty ratio of the PWM signal in the second example of the electric pump 1 of the second embodiment as described above, the monitoring device MD may identify two types of failure states as causes when the motor 12 stops abnormally by recognizing the duty ratio of the PWM signal in another example of the electric pump 1 of the second embodiment.

In the present example, when the failure state of the motor 12 is a first failure state (for example, "excessively low voltage" of the power supply), the control unit 14 sets the duty ratio of the PWM signal for use in monitoring the state of the motor 12 to a first duty ratio (for example, 5[%]) different from the duty ratio (50[%]) which is used when the motor 12 is normal.

When the failure state of the motor 12 is a second failure state (for example, "excessively high voltage" of the power supply) different from the first failure state (for example, "excessively low voltage" of the power supply), the control unit 14 sets the duty ratio of the PWM signal for use in monitoring the state of the motor 12 to a second duty ratio (for example, 10[%]) different from the duty ratio (50[%]) which is used when the motor 12 is normal and the first duty ratio (for example, 5[%]).

Furthermore, the control unit 14 sets the frequency of the PWM signal for use in monitoring the motor 12 in the first failure state (for example, "excessively low voltage" of the power supply) and the frequency of the PWM signal for use in monitoring the motor 12 in the second failure state (for example, "excessively high voltage" of the power supply) to a value equal to the frequency (4 [Hz]) which is used when the motor 12 stops normally.

In the present example, the output switching unit 14A does not output the PWM signal for use in monitoring the motor 12 in the first failure state (for example, "excessively low voltage" of the power supply) and the second failure state (for example, "excessively high voltage" of the power supply) to the motor drive unit 13.

Figure 9:
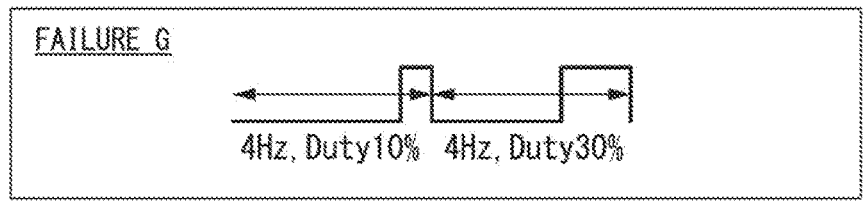
FIG. 9 is a diagram showing a waveform of a PWM signal for use in monitoring a state of the motor when the motor stops abnormally in a third example of the electric pump of the second embodiment.

FIG. 9 is a diagram showing a waveform of a PWM signal for use in monitoring the state of the motor 12 when the motor 12 stops abnormally in a third example of the electric pump 1 of the second embodiment.

As described above, in the second example of the electric pump 1 of the second embodiment, if the failure state of the motor 12 is failure G ("command abnormality (frequency abnormality at stop command time)" for the motor drive unit 13) when the motor 12 stops abnormally, the control unit 14 sets the frequency of the PWM signal for use in monitoring the state of the motor 12 to 4 [Hz] and sets the duty ratio of the PWM signal to 90[%] different from the duty ratio (50[%]) which is used when the motor 12 is normal.

On the other hand, in the third example of the electric pump 1 of the second embodiment, if the failure state of the motor 12 is failure G ("command abnormality (frequency abnormality at stop command time)" for the motor drive unit 13) when the motor 12 stops abnormally, the control unit 14 sets the PWM signal for use in monitoring the state of the motor 12 to a signal including a pulse stream obtained by combining a first pulse having a duty ratio of 10[%] and a second pulse having a duty ratio of 30[%] as shown in FIG. 9.

That is, in the third example of the electric pump 1 of the second embodiment, the control unit 14 sets the PWM signal for use in monitoring the state of the motor 12 when the motor 12 stops abnormally to a signal including a pulse stream obtained by combining the first pulse having a first duty ratio (10[%]) different from the duty ratio (50[%]) which is used when the motor 12 is normal and the second pulse having a second duty ratio (30[%]) different from the duty ratio (50[%]) which is used when the motor 12 is normal and the first duty ratio (10[%]).

Thus, in the third example of the electric pump 1 of the second embodiment, the control unit 14 can output a large number of various types of PWM signals for use in monitoring the state of the motor 12 to the monitoring device MD when the motor 12 stops abnormally and can identify various types of failure states more than the seven types thereof.

Also, in the third example of the electric pump 1 of the second embodiment, the output switching unit 14A does not output the PWM signal for use in monitoring the state of the motor 12 to the motor drive unit 13 when the motor 12 stops abnormally.

Figure 10:
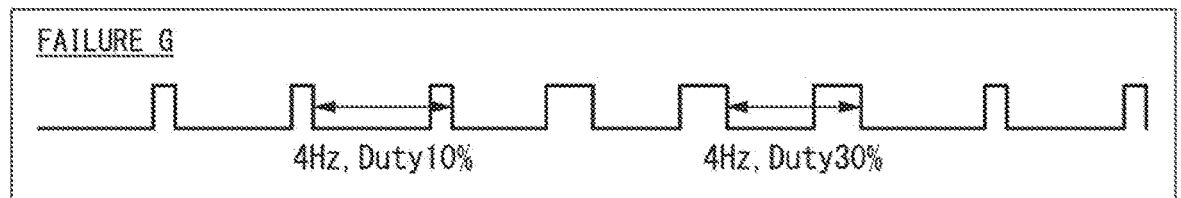
FIG. 10 is a diagram showing a waveform of a PWM signal for use in monitoring a state of the motor when the motor stops abnormally in a fourth example of the electric pump of the second embodiment.

FIG. 10 is a diagram showing a waveform of a PWM signal for use in monitoring the state of the motor 12 when the motor 12 stops abnormally in a fourth example of the electric pump 1 of the second embodiment.

In the fourth example of the electric pump 1 of the second embodiment, if the failure state of the motor 12 is failure G ("command abnormality (frequency abnormality at stop command time)" for the motor drive unit 13) when the motor 12 stops abnormally, the control unit 14 sets the PWM signal for use in monitoring the state of the motor 12 to a signal including a pulse stream obtained by combining a pulse stream obtained by repeating the first pulse having the duty ratio of 10[%], for example, three times, and a pulse stream obtained by repeating the second pulse having the duty ratio of 30[%], for example, three times, as shown in FIG. 10.

That is, in the fourth example of the electric pump 1 of the second embodiment, the control unit 14 sets the PWM signal for use in monitoring the state of the motor 12 when the motor 12 stops abnormally to a signal including a pulse stream obtained by combining a pulse stream obtained by repeating a first pulse of a first duty ratio (10[%]) different from the duty ratio (50[%]) which is used when the motor 12 is normal a plurality of times and a pulse stream obtained by repeating a second pulse of a second duty ratio (30[%])

different from the duty ratio (50[%]) which is used when the motor 12 is normal and the first duty ratio (10[%]) a plurality of times.

Thus, in the fourth example of the electric pump 1 of the second embodiment, as in the third example of the electric pump 1 of the second embodiment, the control unit 14 can output a large number of various types of PWM signals for use in monitoring the state of the motor 12 to the monitoring device MD when the motor 12 stops abnormally and identify various types of failure states more than the seven types thereof.

Also, in the fourth example of the electric pump 1 of the first embodiment, the output switching unit 14A does not output the PWM signal for use in monitoring the state of the motor 12 to the motor drive unit 13 when the motor 12 stops abnormally.

Figure 11:
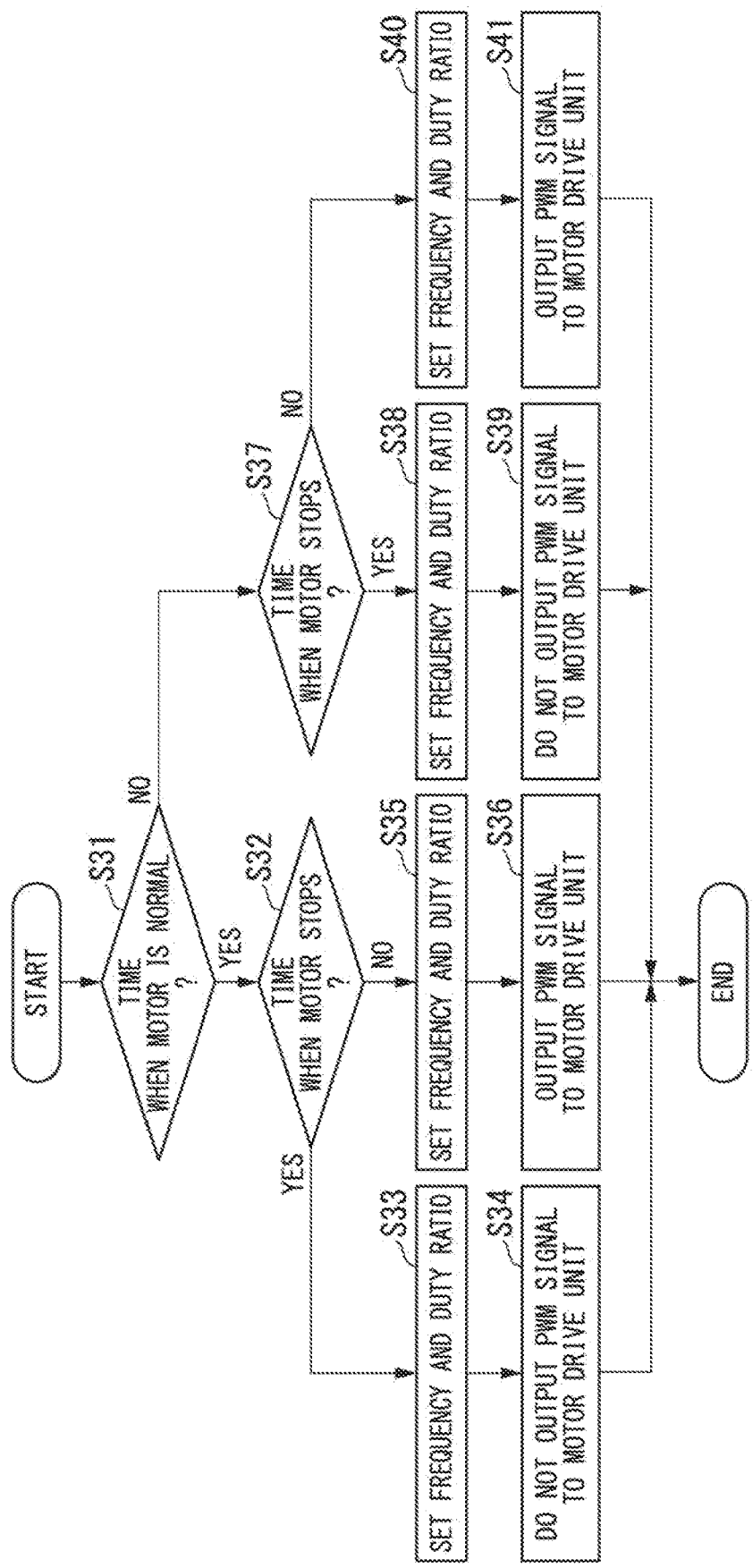
FIG. 11 is a flowchart for describing an example of a process executed in the electric pump of the second embodiment.

FIG. 11 is a flowchart for describing an example of a process executed in the electric pump 1 of the second embodiment.

In the example shown in FIG. 11, in step S31, the control unit 14 determines whether or not the time is the time when the motor is normal. For example, in the case where the voltage of the power supply that supplies electric power to the motor 12 is excessively high, the case where the voltage of the power supply is excessively low, the case where the temperature of the motor 12 is excessively high (i.e., the case where the motor 12 is overheated), the case where the current flowing through the motor 12 is excessive (i.e., the case of the overcurrent of the motor 12), the case of motor lock, the case where a command abnormality (grounding fault) for the motor drive unit 13 occurs, the case where the command abnormality (the frequency abnormality at the stop command time) for the motor drive unit 13 occurs, the case where the motor 12 is in an over-rotation state, and the like, the control unit 14 determines that the time is the time when the motor 12 is abnormal and proceeds to step S37. On the other hand, when the control unit 14 determines that the time is the time when the motor is normal, the process proceeds to step S32.

In step S32, the control unit 14 determines whether or not the time is the time when the motor stops. When the control unit 14 determines that the time is the time when the motor stops (i.e., when the motor 12 stops normally), the process proceeds to step S33. On the other hand, when the control unit 14 determines that the time is not the time when the motor stops (i.e., when the motor 12 is constantly rotating), the process proceeds to step S35.

In step S33, the control unit 14 sets the frequency of the PWM signal to a frequency (4 [Hz]) which is used when the motor 12 stops and sets the duty ratio of the PWM signal to the first duty ratio (50[%]) which is used when the motor 12 is normal.

Subsequently, in step S34, the control unit 14 outputs the PWM signal in which a frequency (4 [Hz]) and a duty ratio (50[%]) are set in step S33 to the monitoring device MD without outputting the PWM signal to the motor drive unit 13. The PWM signal output to the monitoring device MD is used for monitoring the state of the motor 12.

In step S35, the control unit 14 sets the frequency of the PWM signal to a frequency within the first frequency band (the frequency of 20 [Hz] or more and 125 [Hz] or less) which is used when the motor 12 rotates normally and sets the duty ratio of the PWM signal to the first duty ratio (50[%]) which is used when the motor 12 is normal.

Subsequently, in step S36, the control unit 14 outputs a PWM signal in which the frequency (the frequency of 20 [Hz] or more and 125 [Hz] or less) and the duty ratio (50[%]) are set in step S35 to the monitoring device MD. The PWM signal output to the monitoring device MD is used for monitoring the state of the motor 12. At this time, the control unit 14 outputs a PWM signal for rotating the motor 12 at a rotational speed of 800 [rpm] or more and 5000 [rpm] or less to the motor control unit 13.

In step S37, the control unit 14 determines whether or not the time is the time when the motor stops. When the control unit 14 determines that the time is the time when the motor stops (i.e., when the motor 12 stops abnormally), the process proceeds to step S38. On the other hand, when the control unit 14 determines that the time is not the time when the motor stops (i.e., when the motor 12 rotates abnormally), the process proceeds to step S40.

In step S38, the control unit 14 sets the frequency of the PWM signal to the frequency (4 [Hz]) which is used when the motor 12 stops and sets the duty ratio of the PWM signal to the second duty ratio (for example, "10%," "20%," "80%," or the like) different from the first duty ratio ("50%").

Subsequently, in step S39, the control unit 14 outputs a PWM signal in which the frequency (4 [Hz]) and the duty ratio (for example, "10%," "20%," "80%," or the like) are set in step S38 to the monitoring device MD without outputting the PWM signal to the motor drive unit 13. The PWM signal output to the monitoring device MD is used for monitoring the state of the motor 12.

In step S40, the control unit 14 sets the frequency of the PWM signal to a frequency (for example, 200 [Hz] or the like) higher than the frequency band (the frequency of 20 [Hz] or more and 125 [Hz] or less) which is used when the motor 12 rotates normally and sets the duty ratio of the PWM signal to 50[%].

Subsequently, in step S41, the control unit 14 outputs a PWM signal in which the frequency (for example, 200 [Hz] or the like) and the duty ratio (50[%]) are set in step S40 to the monitoring device MD. The PWM signal output to the monitoring device MD is used for monitoring the state of the motor 12. At this time, the control unit 14 outputs a PWM signal for rotating the motor 12 to the motor control unit 13.

Third Embodiment

Hereinafter, a third embodiment of an electric pump and a failure state notification method for the electric pump according to the present invention will be described.

An electric pump 1 of the third embodiment is configured to have a configuration similar to that of the electric pump 1 of the first embodiment described above, except for differences to be described below. Accordingly, according to the electric pump 1 of the third embodiment, it is possible to obtain effects similar to those of the electric pump 1 of the first embodiment described above, except for the differences to be described below.

TABLE 3

| | | Normal stopping | Abnormal stopping | | | | | | Normal rotation |
|---|---|---|---|---|---|---|---|---|---|
| | | | Failure A Excessively low voltage | Failure B Excessively high voltage | Failure C Overcurrent | Failure D Overheating | Failure E Motor lock | Failure F Command abnormality (grounding fault) | Failure G Command abnormality (frequency abnormality at stop command time) | |
| Frequency | Hz | 4 | 2 | 2 | 7 | 7 | 10 | 15 | 15 | 20~ |
| Ratio | % | 50 | 20 | 80 | 20 | 80 | 20 | 20 | 80 | 50 |

Table 3 shows a PWM signal for use in monitoring the state of the motor 12 when the motor 12 stops abnormally in an example of the electric pump 1 of the third embodiment.

As shown in Table 3, in an example of the electric pump 1 of the third embodiment, when the motor 12 stops normally, the control unit 14 sets the frequency of the PWM signal for use in monitoring the state of the motor 12 to 4 [Hz] and sets the duty ratio of the PWM signal to 50[%].

In the example of the electric pump 1 of the third embodiment, if the failure state of the motor 12 is failure A ("excessively low voltage" of the power supply) when the motor 12 stops abnormally, the control unit 14 sets 2 [Hz] different from the frequency (4 [Hz]) used when the motor 12 stops normally and sets the duty ratio of the PWM signal to 20[%] different from the duty ratio (50[%]) which is used when the motor 12 is normal.

In the example of the electric pump 1 of the third embodiment, if the failure state of the motor 12 is failure B ("excessively high voltage" of the power supply) when the motor 12 stops abnormally, the control unit 14 sets the frequency of the PWM signal for use in monitoring the state of the motor 12 to 2 [Hz] different from the frequency (4 [Hz] which is used when the motor 12 stops normally and sets the duty ratio of the PWM signal to 80[%] different from the duty ratio (50[%]) which is used when the motor 12 is normal and 20[%].

In the example of the electric pump 1 of the third embodiment, if the failure state of the motor 12 is failure C ("overcurrent" of the motor 12) when the motor 12 stops abnormally, the control unit 14 sets the frequency of the PWM signal for use in monitoring the state of the motor 12 to 7 [Hz] different from the frequency (4 [Hz]) which is used when the motor 12 stops normally and 2 [Hz] and sets the duty ratio of the PWM signal to 20[%] different from the duty ratio (50[%]) which is used when the motor 12 is normal and 80[%].

In the example of the electric pump 1 of the third embodiment, if the failure state of the motor 12 is failure D ("overheating" of the motor 12) when the motor 12 stops abnormally, the control unit 14 sets the frequency of the PWM signal for use in monitoring the state of the motor 12 to 7 [Hz] different from a frequency (4 [Hz]) which is used when the motor 12 stops normally and 2 [Hz] and sets the duty ratio of the PWM signal to 80[%] different from the duty ratio (50[%]) which is used when the motor 12 is normal and 20[%].

In the example of the electric pump 1 of the third embodiment, if the failure state of the motor 12 is failure E ("motor lock") when the motor 12 stops abnormally, the control unit 14 sets the frequency of the PWM signal for use in monitoring the state of the motor 12 to 10 [Hz] different from a frequency (4 [Hz]) which is used when the motor 12 stops normally, 2 [Hz], and 7 [Hz] and sets the duty ratio of the PWM signal to 20[%] different from the duty ratio (50[%]) which is used when the motor 12 is normal and 80[%].

In the example of the electric pump 1 of the third embodiment, if the failure state of the motor 12 is failure F ("command abnormality (grounding fault)" for the motor drive unit 13) when the motor 12 stops abnormally, the control unit 14 sets the frequency of the PWM signal for use in monitoring the state of the motor 12 to 15 [Hz] different from a frequency (4 [Hz]) which is used when the motor 12 stops normally, 2 [Hz], 7 [Hz], and 10 [Hz] and sets the duty ratio of the PWM signal to 20[%] different from the duty ratio (50[%]) which is used when the motor 12 is normal and 80[%].

In the example of the electric pump 1 of the third embodiment, if the failure state of the motor 12 is failure G ("command abnormality (frequency abnormality at stop command time)" for the motor drive unit 13) when the motor 12 stops abnormally, the control unit 14 sets the frequency of the PWM signal for use in monitoring the state of the motor 12 to 15 [Hz] different from a frequency (4 [Hz]) which is used when the motor 12 stops normally, 2 [Hz], 7 [Hz], and 10 [Hz] and sets the duty ratio of the PWM signal to 80[%] different from the duty ratio (50[%]) which is used when the motor 12 is normal and 20[%].

That is, in the example of the electric pump 1 of the third embodiment, the frequency of the PWM signal for use in monitoring the motor 12 in the states of failure A ("excessively low voltage" of the power supply), failure B ("excessively high voltage" of the power supply), failure C ("overcurrent" of the motor 12), failure D ("overheating" of motor 12), failure E ("motor lock"), failure F ("command abnormality (grounding fault)" for motor drive unit 13), and failure G ("command abnormality (frequency abnormality at stop command time)") is set to a frequency (a frequency lower than 4 [Hz] or a frequency higher than 4 [Hz] and lower than 20 [Hz]) outside of the frequency bands (4 [Hz] and the frequency of 20 [Hz] or more and 125 [Hz] or less) which are used when the motor 12 is normal and the duty ratio of the PWM signal for that is set to a duty ratio (20[%] or 80[%]) different from the duty ratio (50[%]) which is used when the motor 12 is normal.

In the example of the electric pump 1 of the third embodiment, when the motor 12 rotates normally, the control unit 14 sets the frequency of the PWM signal for use in monitoring the state of the motor 12 to a frequency of 20 [Hz] to 125 [Hz] within the frequency bands (4 [Hz] and the frequency of 20 [Hz] or more and 125 [Hz] or less) which are used when the motor 12 is normal and sets the duty ratio of the PWM signal to 50[%].

That is, in the example of the electric pump 1 of the third embodiment, when the motor 12 stops abnormally, the frequency and the duty ratio of the PWM signal output from the control unit 14 are changed and therefore the monitoring device MD can monitor the state of the motor 12 in detail at the time of abnormal stopping.

That is, in the example of the electric pump 1 of the third embodiment, it is unnecessary to change the duty ratio of the PWM signal output from the control unit 14 when the motor 12 rotates normally, i.e., it is unnecessary to increase the load of the process of monitoring the state of the motor 12, and the monitoring device MD can recognize the cause of the abnormal stopping of the motor 12 (an excessively high power-supply voltage, an excessively low power-supply voltage, overcurrent of the motor, overheating of the motor, motor lock, a command abnormality (grounding fault), or a command abnormality (a frequency abnormality at the stop command time)).

Furthermore, in the example of the electric pump 1 of the third embodiment, the output switching unit 14A of the control unit 14 does not output the PWM signal for use in monitoring the motor 12 in the states of failure A ("excessively low voltage" of the power supply), failure B ("excessively high voltage" of the power supply), failure C ("overcurrent" of the motor 12), failure D ("overheating" of the motor 12), failure E ("motor lock"), failure F ("command abnormality (grounding fault)" for the motor drive unit 13), and failure G ("command abnormality (frequency abnormality at stop command time)" for the motor drive unit 13) to the motor drive unit 13.

Although modes for carrying out the present invention have been described using embodiments, the present invention is not limited to the embodiments and various modifications and substitutions can also be made without departing from the scope and spirit of the present invention. The configurations described in the embodiments and the examples described above may be combined.

All or some functions of the parts provided in the electric pump 1 according to the above-described embodiment may be implemented by recording a program for implementing the functions on a computer-readable recording medium and causing a computer system to read and execute the program recorded on the recording medium. Also, the "computer system" described here is assumed to include an OS and hardware such as peripheral devices.

Also, the "computer-readable recording medium" refers to a flexible disk, a magneto-optical disc, a read-only memory (ROM), a portable medium such as a compact disc (CD)-ROM or a storage unit such as a hard disk embedded in the computer system. Further, the "computer readable recording medium" may include a computer-readable recording medium for dynamically retaining the program for a short period of time as in a communication line when the program is transmitted via a network such as the Internet or a communication circuit such as a telephone circuit and a computer-readable recording medium for retaining the program for a given period of time as in a volatile memory inside the computer system including a server and a client when the program is transmitted. Also, the above-described program may be a program for implementing some of the above-described functions. Further, the above-described program may be a program capable of implementing the above-described function in combination with a program already recorded on the computer system.

REFERENCE SIGNS LIST

1 Electric pump
11 Pump
12 Motor
13 Motor drive unit
13A Switching element
13B Rotational speed information processing unit
14 Control unit
14A Output switching unit
14B Rotational speed feedback unit
MD Monitoring device

What is claimed is:

1. An electric pump comprising:
a pump;
a motor configured to drive the pump;
a motor drive unit having a switching element and configured to drive the motor with electric power output from the switching element; and
a control unit configured to output a pulse width modulation (PWM) signal for driving the switching element to the motor drive unit,
wherein the PWM signal output from the control unit is used for monitoring a state of the motor,
wherein when the motor stops abnormally, the control unit sets a frequency of the PWM signal for use in monitoring the state of the motor to a frequency outside of a frequency band which is used when the motor is normal,
wherein when a failure state of the motor is a first failure state, the control unit sets the frequency of the PWM signal for use in monitoring the state of the motor to a first frequency outside of the frequency band which is used when the motor is normal,
wherein when the failure state of the motor is a second failure state different from the first failure state, the control unit sets the frequency of the PWM signal for use in monitoring the state of the motor to a second frequency outside of the frequency band which is used when the motor is normal and different from the first frequency,
wherein a duty ratio of the PWM signal for use in monitoring the motor in the first failure state and a duty ratio of the PWM signal for use in monitoring the motor in the second failure state are set to a value equal to a duty ratio which is used when the motor stops normally,
wherein the control unit includes an output switching unit configured to switch between a state in which the output switching unit outputs the PWM signal to the motor drive unit, and a state in which the output switching unit does not output the PWM signal to the motor drive unit, and
wherein the output switching unit does not output the PWM signal for use in monitoring the motor in the first failure state and the second failure state to the motor drive unit.

2. The electric pump according to claim 1,
wherein the first frequency is 1 Hz,
wherein the second frequency is 2 Hz,
wherein when the failure state of the motor is a third failure state different from the first failure state and the second failure state, the control unit sets the frequency of the PWM signal for use in monitoring the state of the motor to 6 Hz,
wherein when the failure state of the motor is a fourth failure state different from the first failure state, the second failure state, and the third failure state, the control unit sets the frequency of the PWM signal for use in monitoring the state of the motor to 7 Hz,
wherein when the failure state of the motor is a fifth failure state different from the first failure state, the second failure state, the third failure state, and the fourth failure state, the control unit sets the frequency of the PWM signal for use in monitoring the state of the motor to 8 Hz, wherein when the failure state of the motor is a sixth failure state different from the first failure state, the second failure state, the third failure state, the fourth failure state, and the fifth failure state, the control unit sets the frequency of the PWM signal for use in monitoring the state of the motor to 10 Hz, wherein when the failure state of the motor is a seventh failure state different from the first failure state, the second failure state, the third failure state, the fourth failure state, the fifth failure state, and the sixth failure state, the control unit sets the frequency of the PWM signal for use in monitoring the state of the motor to 12 Hz, wherein the duty ratio of the PWM signal for use in monitoring the motor in the first failure state, the duty ratio of the PWM signal for use in monitoring the motor in the second failure state, a duty ratio of the PWM signal for use in monitoring the motor in the third failure state, a duty ratio of the PWM signal for use in monitoring the motor in the fourth failure state, a duty ratio of the PWM signal for use in monitoring the motor in the fifth failure state, a duty ratio of the PWM signal for use in monitoring the motor in the sixth failure state, and a duty ratio of the PWM signal for use in monitoring the motor in the seventh failure state are set to a value equal to the duty ratio which is used when the motor stops normally by the control unit, and wherein the output switching unit does not output the PWM signal for use in monitoring the motor in the first failure state, the second failure state, the third failure state, the fourth failure state, the fifth failure state, the sixth failure state, and the seventh failure state to the motor drive unit.

3. The electric pump according to claim 1, wherein the control unit sets the PWM signal for use in monitoring the state of the motor when the motor stops abnormally to a signal including a pulse stream obtained by combining a first pulse of the first frequency and a second pulse of the second frequency, and wherein the output switching unit does not output the PWM signal for use in monitoring the state of the motor to the motor drive unit when the motor stops abnormally.

4. The electric pump according to claim 1, wherein the control unit sets the PWM signal for use in monitoring the state of the motor when the motor stops abnormally to a signal including a pulse stream obtained by combining a pulse stream obtained by repeating a first pulse of the first frequency a plurality of times and a pulse stream obtained by repeating a second pulse of the second frequency a plurality of times, and wherein the output switching unit does not output the PWM signal for use in monitoring the state of the motor to the motor drive unit when the motor stops abnormally.

5. An electric pump comprising:

a pump;

a motor configured to drive the pump;

a motor drive unit having a switching element and configured to drive the motor with electric power output from the switching element; and a control unit configured to output a pulse width modulation (PWM) signal for driving the switching element to the motor drive unit, wherein the PWM signal output from the control unit is used for monitoring a state of the motor, wherein when the motor stops abnormally, the control unit sets a duty ratio of the PWM signal for use in monitoring the state of the motor to a duty ratio different from a duty ratio which is used when the motor is normal, wherein the control unit includes an output switching unit configured to switch between a state in which the output switching unit outputs the PWM signal to the motor drive unit, and a state in which the output switching unit does not output the PWM signal to the motor drive unit, wherein the output switching unit does not output the PWM signal for use in monitoring the state of the motor to the motor drive unit when the motor stops abnormally, wherein when a failure state of the motor is a first failure state, the control unit sets the duty ratio of the PWM signal for use in monitoring the state of the motor to a first duty ratio different from the duty ratio which is used when the motor is normal, wherein when the failure state of the motor is a second failure state different from the first failure state, the control unit sets the duty ratio of the PWM signal for use in monitoring the state of the motor to a second duty ratio different from the duty ratio which is used when the motor is normal and the first duty ratio, and wherein a frequency of the PWM signal for use in monitoring the motor in the first failure state and a frequency of the PWM signal for use in monitoring the motor in the second failure state are set to a value equal to a frequency which is used when the motor stops normally by the control unit.

6. The electric pump according to claim 5, wherein the first duty ratio is 5%, wherein the second duty ratio is 10%, wherein when the failure state of the motor is a third failure state different from the first failure state and the second failure state, the control unit sets the duty ratio of the PWM signal for use in monitoring the state of the motor to 20%, wherein when the failure state of the motor is a fourth failure state different from the first failure state, the second failure state, and the third failure state, the control unit sets the duty ratio of the PWM signal for use in monitoring the state of the motor to 30%, wherein when the failure state of the motor is a fifth failure state different from the first failure state, the second failure state, the third failure state, and the fourth failure state, the control unit sets the duty ratio of the PWM signal for use in monitoring the state of the motor to 70%, wherein when the failure state of the motor is a sixth failure state different from the first failure state, the second failure state, the third failure state, the fourth failure state, and the fifth failure state, the control unit sets the duty ratio of the PWM signal for use in monitoring the state of the motor to 80%, wherein when the failure state of the motor is a seventh failure state different from the first failure state, the second failure state, the third failure state, the fourth failure state, the fifth failure state, and the sixth failure state, the control unit sets the duty ratio of the PWM signal for use in monitoring the state of the motor to 90%, wherein the frequency of the PWM signal for use in monitoring the motor in the first failure state, the frequency of the PWM signal for use in monitoring the motor in the second failure state, a frequency of the PWM signal for use in monitoring the motor in the third failure state, a frequency of the PWM signal for use in monitoring the motor in the fourth failure state, a frequency of the PWM signal for use in monitoring the motor in the fifth failure state, a frequency of the PWM signal for use in monitoring the motor in the sixth failure state, and a frequency of the PWM signal for use in monitoring the motor in the seventh failure state is set to a value equal to the frequency which is used when the motor stops normally by the control unit, and wherein the output switching unit does not output the PWM signal for use in monitoring the motor in the first failure state, the second failure state, the third failure state, the fourth failure state, the fifth failure state, the sixth failure state, and the seventh failure state to the motor drive unit.

7. The electric pump according to claim 5, wherein the control unit sets the PWM signal for use in monitoring the state of the motor when the motor stops abnormally to a signal including a pulse stream obtained by combining a first pulse of the first duty ratio and a second pulse of the second duty ratio.

8. The electric pump according to claim 5, wherein the control unit sets the PWM signal for use in monitoring the state of the motor when the motor stops abnormally to a signal including a pulse stream obtained by combining a pulse stream obtained by repeating a first pulse of the first duty ratio a plurality of times and a pulse stream obtained by repeating a second pulse of the second duty ratio a plurality of times.

9. An electric pump comprising:
a pump;
a motor configured to drive the pump;
a motor drive unit having a switching element and configured to drive the motor with electric power output from the switching element; and
a control unit configured to output a pulse width modulation (PWM) signal for driving the switching element to the motor drive unit,
wherein the PWM signal output from the control unit is used for monitoring a state of the motor,
wherein when the motor stops abnormally, the control unit
sets a frequency of the PWM signal for use in monitoring the state of the motor to a frequency outside of a frequency band which is used when the motor is normal and
sets a duty ratio of the PWM signal for use in monitoring the state of the motor to a duty ratio different from a duty ratio which is used when the motor is normal,
wherein when a failure state of the motor is a first failure state, the control unit sets the frequency of the PWM signal for use in monitoring the state of the motor to 2 Hz and sets the duty ratio of the PWM signal for use in monitoring the state of the motor to 20%,
wherein when the failure state of the motor is a second failure state different from the first failure state, the control unit sets the frequency of the PWM signal for use in monitoring the state of the motor to 2 Hz and sets the duty ratio of the PWM signal for use in monitoring the state of the motor to 80%, wherein when the failure state of the motor is a third failure state different from the first failure state and the second failure state, the control unit sets the frequency of the PWM signal for use in monitoring the state of the motor to 7 Hz and sets the duty ratio of the PWM signal for use in monitoring the state of the motor to 20%, wherein when the failure state of the motor is a fourth failure state different from the first failure state, the second failure state, and the third failure state, the control unit sets the frequency of the PWM signal for use in monitoring the state of the motor to 7 Hz and sets the duty ratio of the PWM signal for use in monitoring the state of the motor to 80%, wherein when the failure state of the motor is a fifth failure state different from the first failure state, the second failure state, the third failure state, and the fourth failure state, the control unit sets the frequency of the PWM signal for use in monitoring the state of the motor to 10 Hz and sets the duty ratio of the PWM signal for use in monitoring the state of the motor to 20%, wherein when the failure state of the motor is a sixth failure state different from the first failure state, the second failure state, the third failure state, the fourth failure state, and the fifth failure state, the control unit sets the frequency of the PWM signal for use in monitoring the state of the motor to 15 Hz and sets the duty ratio of the PWM signal for use in monitoring the state of the motor to 20%, and wherein when the failure state of the motor is a seventh failure state different from the first failure state, the second failure state, the third failure state, the fourth failure state, the fifth failure state, and the sixth failure state, the control unit sets the frequency of the PWM signal for use in monitoring the state of the motor to 15 Hz and sets the duty ratio of the PWM signal for use in monitoring the state of the motor to 80%.

10. The electric pump according to claim 9,
wherein the control unit includes an output switching unit configured to switch between a state in which the output switching unit outputs the PWM signal to the motor drive unit, and a state in which the output switching unit does not output the PWM signal to the motor drive unit, and
wherein the output switching unit does not output the PWM signal for use in monitoring the motor in the first failure state, the second failure state, the third failure state, the fourth failure state, the fifth failure state, the sixth failure state, and the seventh failure state to the motor drive unit.

11. A failure state notification method for an electric pump comprising:
a pump;
a motor configured to drive the pump;
a motor drive unit having a switching element and configured to drive the motor with electric power output from the switching element; and
a control unit configured to output a pulse width modulation (PWM) signal for driving the switching element to the motor drive unit,
wherein the PWM signal output from the control unit is used for monitoring a state of the motor,
the method comprising:
a first step in which when the motor is normal, the control unit sets a frequency of the PWM signal for use in monitoring the state of the motor to a frequency within a first frequency band; and a second step in which when the motor stops abnormally, the control unit sets the frequency of the PWM signal for use in monitoring the state of the motor to a frequency within a second frequency band different from the first frequency band.

12. A failure state notification method for an electric pump comprising:
 a pump;
 a motor configured to drive the pump;
 a motor drive unit having a switching element and configured to drive the motor with electric power output from the switching element; and
 a control unit configured to output a pulse width modulation (PWM) signal for driving the switching element to the motor drive unit,
 wherein the PWM signal output from the control unit is used for monitoring a state of the motor,
 the method comprising:
 a first step in which when the motor is normal, the control unit sets a duty ratio of the PWM signal for use in monitoring the state of the motor to a first duty ratio; and
 a second step in which when the motor stops abnormally, the control unit sets the duty ratio of the PWM signal for use in monitoring the state of the motor to a second duty ratio different from the first duty ratio,
 wherein the PWM signal for use in monitoring the state of the motor is not output to the motor drive unit when the motor stops abnormally.

\* \* \* \* \*